US012739671B2

(12) United States Patent
Lopatin et al.

(10) Patent No.: US 12,739,671 B2
(45) Date of Patent: Sep. 15, 2026

(54) SEGMENTED COMMUNICATION OVER WIRELESS NETWORKS

(71) Applicant: Apple Inc., Cupertino, CA (US)

(72) Inventors: Scott Lopatin, Santa Cruz, CA (US); Sugam Jain, San Francisco, CA (US); Frederic Jacobs, St. Sulpice (CH)

(73) Assignee: Apple Inc., Cupertino, CA (US)

( * ) Notice: Subject to any disclaimer, the term of this patent is extended or adjusted under 35 U.S.C. 154(b) by 405 days.

(21) Appl. No.: 18/455,880

(22) Filed: Aug. 25, 2023

(65) Prior Publication Data

US 2025/0071581 A1 Feb. 27, 2025

(51) Int. Cl.
*H04W 24/08* (2009.01)
*H04W 4/12* (2009.01)
*H04W 84/06* (2009.01)

(52) U.S. Cl.
CPC ............. *H04W 24/08* (2013.01); *H04W 4/12* (2013.01); *H04W 84/06* (2013.01)

(58) Field of Classification Search
CPC ... H04W 24/08; H04W 4/12; H04W 36/0085; H04W 36/14; H04W 36/30; H04W 84/06; H04L 7/1851; H04L 43/16; H04L 65/80
USPC .......................................................... 370/329
See application file for complete search history.

(56) References Cited

U.S. PATENT DOCUMENTS 7,812,826 B2 * 10/2010 Ording ................ G06F 3/04845 345/169
7,965,680 B2 * 6/2011 Jhamnani ............. H04W 72/30 370/468
8,781,475 B1 * 7/2014 McKeeman ........ H04W 36/324 455/437
9,148,802 B2 * 9/2015 Jackson .............. H04L 43/0852
9,807,641 B2 * 10/2017 Egner ............... H04W 28/0221
9,860,075 B1 * 1/2018 Gerszberg ................ H04B 1/38
10,361,771 B2 7/2019 Darapu et al.
11,158,877 B2 * 10/2021 Jang ...................... H01M 8/023
(Continued)

FOREIGN PATENT DOCUMENTS

WO 2015177602 A1 11/2015

OTHER PUBLICATIONS

U.S. Appl. No. 17/948,065, filed Sep. 19, 2022.
(Continued)

*Primary Examiner* — Jean A Gelin
(74) *Attorney, Agent, or Firm* — Treyz Law Group, P.C.; Michael H. Lyons

(57) ABSTRACT

A communications system may include user equipment (UE) that transmits data to a recipient via a network. The UE may receive user input and may generate the data based on the input. When a terrestrial network is unavailable to the UE, the UE may transmit segments of the data over a satellite constellation as the UE continues to receive input and while connectivity to the constellation exceeds a threshold. If a portion of the input includes an edit to a previous segment, the UE may include an edit flag in the corresponding segment. Once input has finished, the UE may sign the segments and may transmit a signature over the constellation. The network may store the segments as received from the constellation, may replace edited segments with more recent segments containing edit flags, and may compile and transmit all of the segments to the recipient upon receipt of the signature.

20 Claims, 10 Drawing Sheets

(56) References Cited

U.S. PATENT DOCUMENTS

| | | | | |
|---|---|---|---|---|
| 11,399,407 | B2 * | 7/2022 | Lee | H04W 48/16 |
| 11,769,531 | B1 * | 9/2023 | Lucas | H04N 21/4532 386/282 |
| 12,114,220 | B2 * | 10/2024 | Marupaduga | H04W 36/14 |
| 12,386,014 | B2 * | 8/2025 | Duan | G01S 19/48 |
| 2007/0150631 | A1 * | 6/2007 | Druke | B25J 9/1661 710/244 |
| 2007/0152984 | A1 * | 7/2007 | Ording | G06F 3/04883 345/173 |
| 2008/0220819 | A1 * | 9/2008 | Ben-Eli | H04B 7/0877 455/561 |
| 2009/0059832 | A1 * | 3/2009 | Jhamnani | H04W 72/30 370/312 |
| 2013/0229976 | A1 * | 9/2013 | Srinivasan | H04W 36/22 370/315 |
| 2013/0322265 | A1 * | 12/2013 | Kozisek | H04L 41/142 370/251 |
| 2014/0357259 | A1 * | 12/2014 | Tomeczko | H04W 24/04 455/423 |
| 2016/0007157 | A1 * | 1/2016 | Tipton | G06Q 30/0261 455/456.1 |
| 2017/0041850 | A1 | 2/2017 | Benammar et al. | |
| 2020/0214086 | A1 * | 7/2020 | Christopherson | H04W 88/10 |
| 2020/0383068 | A1 * | 12/2020 | Yang | H04W 52/283 |
| 2021/0153087 | A1 * | 5/2021 | Lee | H04W 36/08 |
| 2021/0219143 | A1 * | 7/2021 | Khalid | H04W 76/27 |
| 2022/0022077 | A1 * | 1/2022 | Maganti | H04B 17/318 |
| 2022/0225130 | A1 | 7/2022 | Yu | |
| 2022/0394606 | A1 * | 12/2022 | Yang | H04W 16/14 |
| 2023/0063694 | A1 * | 3/2023 | Byon | H04M 3/5116 |
| 2023/0327790 | A1 * | 10/2023 | Da Silva | H04B 17/3913 455/67.11 |
| 2024/0077568 | A1 * | 3/2024 | Duan | G01S 5/0218 |
| 2024/0204862 | A1 * | 6/2024 | Macias | H04W 36/322 |
| 2024/0292293 | A1 * | 8/2024 | Bai | H04W 24/10 |

OTHER PUBLICATIONS

U.S. Appl. No. 17/483,665, filed Sep. 23, 2021.
U.S. Appl. No. 17/483,669, filed Sep. 23, 2021.
U.S. Appl. No. 17/483,451, filed Sep. 23, 2021.

* cited by examiner

SEGMENTED COMMUNICATION OVER WIRELESS NETWORKS

FIELD

This relates generally to wireless communications, including wireless communications by user equipment devices.

BACKGROUND

Communications systems are used to convey data between terminals such as user equipment (UE) devices. In performing wireless communications, a UE device wirelessly transmits data to a wireless network. The wireless network forwards the data to an intended recipient device.

In practice, some wireless networks exhibit limited speed and/or bandwidth in communicating with UE devices. If care is not taken, a UE device will need to wait an excessive amount of time to successfully transmit data to the recipient device over such a wireless network, which can be detrimental to user experience.

SUMMARY

A communications system may include a user equipment (UE) device that transmits wireless data to a recipient device via a core network. The communications system may include a first wireless network and a second wireless network that exhibits greater maximum speed than the first wireless network. The first wireless network may be a terrestrial network such as a cellular telephone network or a wireless local area network, for example. The second wireless network may be a space-based network that includes gateways and a satellite constellation, for example.

The UE device may include an input device that receives user input. The UE device may generate the wireless data based on the user input. When the first wireless network is available to the UE device, the UE device may transmit the wireless data over the first wireless network as non-segmented data after the input device has finished receiving the user input. When the second wireless network is unavailable, the UE device may transmit the wireless data over the second wireless network as segmented data.

For example, while a wireless connectivity level (e.g., measurement of wireless performance metric data) between the UE device and the second wireless network exceeds a threshold level, the UE device may encrypt and transmit segments of the wireless data as the user continues to provide the user input. If a portion of the user input includes an edit to a previously transmitted segment, the segment corresponding to that portion of the user input may include an edit flag identifying that the segment is an edit to the previously transmitted segment. These transmissions may occur in the background while the user continues to provide user input (e.g., without the user knowing that transmission has already begun). Once the user has indicated that they have finished providing the user input (e.g., when the user input includes a termination identifier such as a send button press on a touch screen of the UE device), the UE device may sign all of the segments and may transmit a UE device signature to the second wireless network along with a final segment of the wireless data.

The second wireless network may forward the segments of wireless data to the core network as the segments are received from the UE device. The core network may store the segments of wireless data as the segments are received from the second wireless network. If the core network receives a segment that contains an edit flag, the core network may replace the stored segment identified by the edit flag with the segment that contained the edit flag. Once the core network receives the UE device signature, indicating that the user input has finished and that the UE device has no further segments of the wireless data to transmit, the core network may reconstruct the wireless data by combining (e.g., compiling or packaging) all of the stored segments. The core network may then forward the reconstructed wireless data to the recipient device. Once the recipient device has successfully received the reconstructed wireless data, the core network may transmit a delivery confirmation to the UE device over the second wireless network. In this way, the UE device may continue to be able to transmit wireless data to the recipient device under different operating conditions while also minimizing the amount of time the user must wait for successful transmission and delivery confirmation via the relatively slow second wireless network.

An aspect of the disclosure provides a method of operating one or more nodes of a network to transmit data from a user equipment (UE) device to a recipient device. The method can include storing, at storage circuitry, a first segment of the data received via a satellite constellation at a first time, the first segment of the data being generated by the UE device based on a first input received by the UE device. The method can include storing, at the storage circuitry, a second segment of the data received via the satellite constellation at a second time after the first time, the second segment of the data being generated by the UE device based on a second input received by the UE device after the first input. The method can include generating, using one or more processors, reconstructed data by combining the first segment and the second segment. The method can include transmitting the reconstructed data to the recipient device.

An aspect of the disclosure provides a method of operating one or more network nodes to forward data from a user equipment (UE) device to a recipient device, the data being associated with an input received at the UE device. The method can include storing, at storage circuitry, segments of the data received via a communications satellite, each segment being transmitted by the UE device at a different respective time prior to completion of the input at the UE device. The method can include generating, using one or more processors, reconstructed data by combining the segments after completion of the input at the UE device. The method can include transmitting the reconstructed data to the recipient device.

An aspect of the disclosure provides a method of operating one or more nodes of a network. The method can include receiving first data conveyed by a terrestrial wireless network, the first data being transmitted by a user equipment (UE) device while the terrestrial wireless network is available to the UE device. The method can include transmitting the first data to a recipient device. The method can include receiving second data conveyed by a satellite constellation, the second data being transmitted, by the UE device, in a series of segments while the terrestrial wireless network is unavailable to the UE device. The method can include generating, using one or more processors, reconstructed data by compiling the series of segments. The method can include transmitting the reconstructed data to the recipient device.

DETAILED DESCRIPTION

Figure 1:
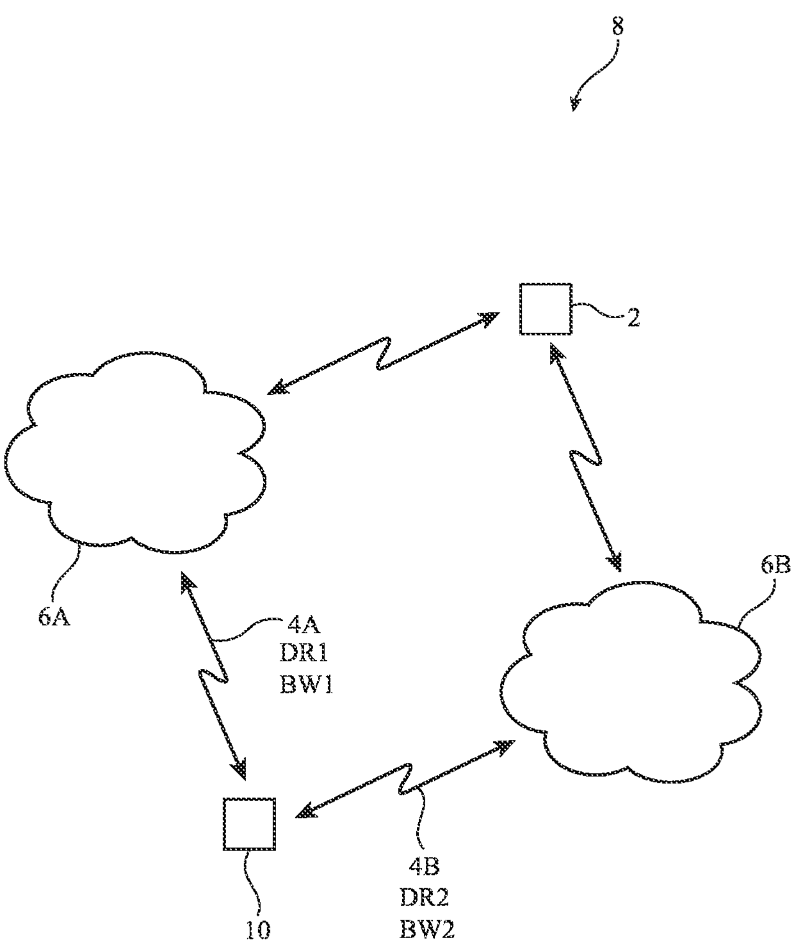
FIG. 1 is a diagram of an illustrative communications system having multiple wireless networks of different speeds for forwarding data from a user equipment device to a recipient device in accordance with some embodiments.

FIG. 1 is a diagram of an illustrative communications system 8. Communications system 8 (sometimes referred to herein as communications network 8, network 8, or system 8) may include a user equipment (UE) device 10 and a recipient such as recipient device 2. Communications system 8 may include multiple different wireless networks 6 such as at least a first wireless network 6A and a second wireless network 6B.

In general, wireless network 6A may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). The nodes of wireless network 6A may be organized into one or more relay networks, mesh networks, local area networks (LANs), wireless local area networks (WLANs), ring networks (e.g., optical rings), cloud networks, virtual/logical networks, the Internet, combinations of these, and/or using any other desired network topologies. The network nodes, terminals, and/or end hosts may include network switches, network routers, optical add-drop multiplexers, other multiplexers, repeaters, modems, servers, network cards, wireless access points, wireless base stations, and/or any other desired network components. The network nodes in wireless network 6A may include physical components such as electronic devices, servers, computers, user equipment, etc., and/or may include virtual components that are logically defined in software and that are distributed across (over) two or more underlying physical devices (e.g., in a cloud network configuration).

Similarly, wireless network 6B may include any desired number of network nodes, terminals, and/or end hosts that are communicably coupled together using communications paths that include wired and/or wireless links. The nodes of wireless network 6B may be organized into one or more relay networks, mesh networks, local area networks (LANs), wireless local area networks (WLANs), ring networks (e.g., optical rings), cloud networks, virtual/logical networks, the Internet, combinations of these, and/or using any other desired network topologies. The network nodes, terminals, and/or end hosts may include network switches, network routers, optical add-drop multiplexers, other multiplexers, repeaters, modems, servers, network cards, wireless access points, wireless base stations, and/or any other desired network components. The network nodes in wireless network 6B may include physical components such as electronic devices, servers, computers, user equipment, etc., and/or may include virtual components that are logically defined in software and that are distributed across (over) two or more underlying physical devices (e.g., in a cloud network configuration).

UE device 10 may convey radio-frequency signals 4 with one or more nodes of wireless network 6A and 6B. For example, UE device 10 may convey radio-frequency signals 4A with one or more nodes of wireless network 6A and may convey radio-frequency signals 4B with one or more nodes of wireless network 6B. UE device 10 may convey radio-frequency signals 4 with only one of wireless networks 6A and 6B at a given time or may, if desired, concurrently convey radio-frequency signals 4 with both wireless networks 6A and 6B.

UE device 10 and wireless network 6A may convey radio-frequency signals 4A with a first maximum (peak) speed (e.g., with a first maximum (peak) data rate DR1, a first maximum (peak) bandwidth BW1, and/or a first maximum (peak) quality/connectivity level). UE device 10 and wireless network 6B may convey radio-frequency signals 4B with a second maximum speed that is less (slower) than the first maximum speed (e.g., with a second data rate DR2 less than data rate DR1, a second bandwidth BW2 less than bandwidth BW1, and/or a second quality/connectivity level less than the first quality/connectivity level). The slower maximum speed of wireless network 6B may be due to technological limitations of the network nodes of wireless network 6B, failure or less than ideal performance of one or more components of one or more of the nodes of wireless network 6B, and/or worse radio-frequency propagation conditions (e.g., channel conditions) between UE device 10 and the nodes of wireless network 6B than between UE device 10 and the nodes of wireless network 6A, as examples.

When UE device 10 has wireless data to transmit to recipient device 2, UE device 10 may transmit the wireless data in radio-frequency signals 4A and/or 4B (e.g., in an uplink (UL) direction from UE device 10 to the wireless network 6A and/or wireless network 6B). Wireless network 6A and/or wireless network 6B may receive radio-frequency signals 4A and/or 4B and may forward the wireless data from the radio-frequency signals to recipient device 2 (e.g., over one or more other network nodes or network portions of communications system 8 that are not shown in FIG. 1 for the sake of clarity). Wireless network 6A and wireless network 6B may be owned, controlled, and/or operated by different wireless (network) service providers, carriers, and/or administrators. Alternatively, wireless network 6A and wireless network 6B may be owned, controlled, administered, and/or operated by the same wireless service provider, carrier, and/or administrator.

In general, wireless network 6A may forward the wireless data to recipient device 2 more quickly than wireless network 6B (e.g., wireless network 6A may have greater communications forwarding capacity than wireless network 6B). Because of this, UE device 10 may use radio-frequency signals 4A and wireless network 6A to transmit the wireless data to recipient 2 whenever wireless network 6A is available to UE device 10. However, situations may arise when wireless network 6A is unavailable to UE device 10.

Such situations may arise, for example, when one or more components of one or more nodes of wireless network 6A fail or exhibit unsatisfactory levels of performance, when UE device 10 does not have a service agreement (or has a lapsed service agreement) with the service provider, carrier, and/or administrator of wireless network 6A, when one or more of the nodes of wireless network 6A are subject to a power outage, blackout, emergency event, or disaster, when the radio-frequency propagation conditions (e.g., channel conditions) between UE device 10 and the nodes of wireless network 6A are below a threshold level (e.g., because UE device 10 is or has moved outside the wireless coverage area of the nodes of wireless network 6A), when UE device 10 does not have sufficient power or other resources to successfully communicate with wireless network 6A, when a user of UE device 10 instructs or controls UE device 10 not to communicate with wireless network 6A, when one or more components of UE device 10 that supports communication with wireless network 6A fail or otherwise exhibit less than satisfactory levels of performance, when wireless network 6A lacks sufficient communications resources to support forwarding of wireless data for UE device 10 (e.g., when the overall traffic load at wireless network 6A exceeds a threshold level or otherwise prevents wireless network 6A from being able to convey wireless data for UE device 10), etc.

In these situations, UE device 10 may instead use radio-frequency signals 4B and wireless network 6B to transmit the wireless data to recipient 2 (e.g., wireless network 6B may serve as a backup or failover network to wireless network 6A for the transmission of the wireless data). While wireless network 6B may exhibit slower peak speeds or lower peak levels of wireless performance than wireless network 6A, wireless network 6B may, in general, exhibit a larger coverage area that allows UE device 10 to continue to be able to convey radio-frequency signals 4B with wireless network 6B even when UE device 10 is outside the coverage area of or is otherwise unable to communicate with wireless network 6A. Wireless network 6B may therefore sometimes be referred to herein as slow (wireless) network 6B, low capacity (wireless) network 6B, low data rate (wireless) network 6B, low speed (wireless) network 6B, low bandwidth (wireless) network 6B, failover (wireless) network 6B, secondary (wireless) network 6B, or backup (wireless) network 6B, whereas wireless network 6A is sometimes referred to herein as fast (wireless) network 6A, high capacity (wireless) network 6A, high data rate (wireless) network 6A, high speed (wireless) network 6A, high bandwidth (wireless) network 6B, or primary (wireless) network 6A.

Radio-frequency signals 4A and radio-frequency signals 4B may be conveyed using different radio access technologies (RATs) or may, if desired, be conveyed using the same RAT. Radio-frequency signals 4A and radio-frequency signals 4B may be conveyed using different wireless communications protocols or may, if desired, be conveyed using the same wireless communications protocol. In general, fast network 6A and slow network 6B may be any desired wireless networks that convey wireless data using any desired RAT(s) and/or any desired communications protocols. An implementation in which fast network 6A is a terrestrial-based wireless network and slow network 6B is a space-based wireless network is described herein as an example.

Figure 2:
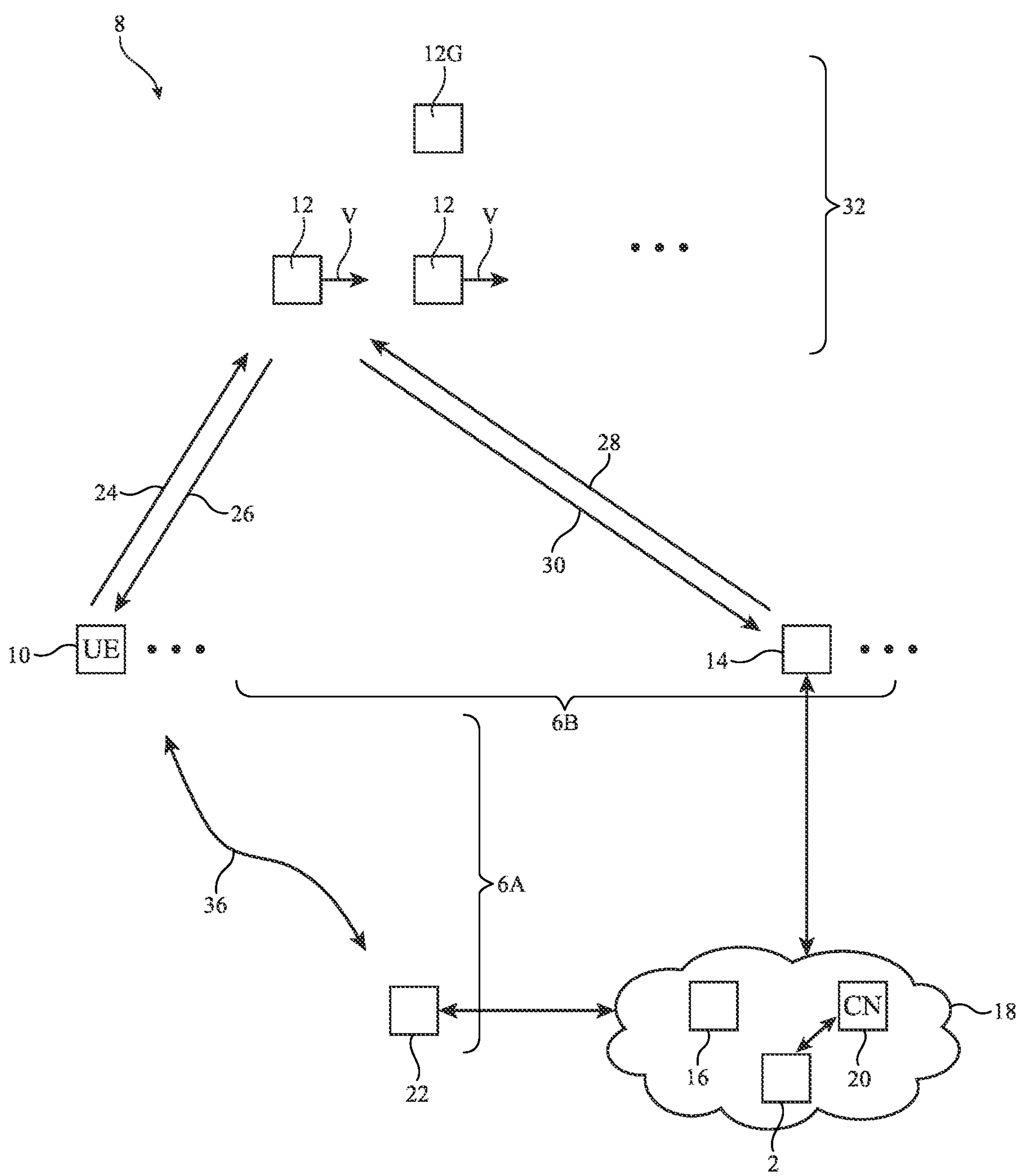
FIG. 2 is a diagram of an illustrative communications system having a terrestrial wireless network and a space-based wireless network for forwarding data from a user equipment device to a recipient device in accordance with some embodiments.

FIG. 2 is a diagram of communications network 8 in such an implementation where fast network 6A is a terrestrial-based wireless network (e.g., a communications network in which the network node(s) that convey radio-frequency signals 4A (FIG. 1) with UE device 10 are located on Earth) and slow network 6B is a space-based wireless network (e.g., a communications network in which the network node(s) that convey radio-frequency signals 4B (FIG. 1) with UE device 10 are located in space or in orbit around Earth).

As shown in FIG. 2, slow network 6B may include a ground-based (terrestrial) gateway system that includes one or more gateways 14 on Earth. Slow network 6B may also include a constellation 32 of communication satellites 12 (sometimes referred to herein simply as satellites 12). Constellation 32 may sometimes also be referred to herein as satellite constellation 32. Gateways 14 may sometimes also be referred to as ground stations 14. Gateways 14 and satellites 12 may form network nodes (devices) of slow network 6B. Gateways 14 may be stationary on Earth whereas UE devices such as UE device 10 may move across Earth over time.

Each gateway 14 may include one or more antennas (e.g., electronically and/or mechanically adjustable antennas), modems, transceivers, amplifiers, beam forming circuitry, control circuitry (e.g., one or more processors, storage circuitry, etc.) and other components that are used to convey communications data. The components of each gateway 14 may, for example, be disposed at a respective geographic location (e.g., within the same computer, server, data center, building, etc.).

On the other hand, fast network 6A may include terrestrial-based wireless devices 22. Terrestrial-based wireless devices 22 (sometimes referred to herein as terrestrial-based wireless equipment 22 or simply as wireless devices 22) may form network nodes (devices) of fast network 6A. Wireless devices 22 may include one or more wireless base stations (e.g., for implementing fast network 6A as a cellular telephone network) and/or one or more wireless access points (e.g., for implementing fast network 6A as a wireless local area network). Each wireless device 22 in fast network 6A may be located at a different respective geographic location on Earth (e.g., across different regions, areas, rooms, buildings, streets, blocks, campuses, cities, states, counties, etc.). While fast network 6A may include any desired number of wireless devices 22, a single wireless device 22 is illustrated in FIG. 1 for the sake of clarity.

Each wireless device 22 in fast network 6A may convey radio-frequency signals (e.g., radio-frequency signals 4A of FIG. 1) within a corresponding coverage area or region, sometimes referred to as a cell. Similarly, each satellite 12 in slow network 6B may convey radio-frequency signals (e.g., radio-frequency signals 4B of FIG. 1) within a corresponding coverage area or region, sometimes referred to as a cell or beam (e.g., spot beam). If desired, each satellite 12 may concurrently convey radio-frequency signals within multiple different cells (spot beams) and/or may change the spatial location of its active cell(s) (spot beam(s)) over time to further expand the overall coverage area of the satellite (e.g., using a time division duplexing scheme).

The satellites 12 in constellation 32 of slow network 6B may use radio-frequency signals (e.g., radio-frequency signals 4B of FIG. 1) to convey wireless data between UE device 10 and one or more gateways 14. Satellites 12 are located in space (e.g., in orbit above Earth). While slow network 6B may include any desired number of gateways 14 and any desired number of satellites 12, only a single gateway 14 and three satellites 12 are illustrated in FIG. 1 for the sake of clarity. Each gateway 14 in slow network 6B may be located at a different respective geographic location on Earth (e.g., across different regions, states, provinces, countries, continents, etc.).

Communications system 8 may also include a terrestrial network such as network portion 18 that is communicably coupled to each of the gateways 6B in slow network 6B and to each of the wireless devices 22 in fast network 6A. Network portion 18 may include recipient device 2 (e.g., recipient device 2 may be a node, terminal, or end host of network portion 18). Gateway(s) 14 may convey wireless data between network portion 18 and UE device 10 via constellation 32. Wireless device(s) 22 may convey wireless data between network portion 18 and UE device 10. One or more network nodes in network portion 18 may convey the wireless data between slow network 6B, fast network 6A, and recipient 2.

Network portion 18 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, etc.). Network portion 18 may include one or more relay networks, mesh networks, local area networks (LANs), wireless local area networks (WLANs), ring networks (e.g., optical rings), cloud networks, virtual/logical networks, the Internet, combinations of these, and/or any other desired network nodes coupled together using any desired network topologies (e.g., on Earth). The network nodes, terminals, and/or end hosts may include network switches, network routers, optical add-drop multiplexers, other multiplexers, repeaters, modems, servers, network cards, wireless access points, wireless base stations, UE devices such as UE devices 10, and/or any other desired network components. The network nodes in network portion 18 may include physical components such as electronic devices, servers, computers, user equipment, etc., and/or may include virtual components that are logically defined in software and that are distributed across (over) two or more underlying physical devices (e.g., in a cloud network configuration).

Network portion 18 may include one or more satellite network operations centers such as network operations center (NOC) 16. NOC 16 may control the operation of gateways 14 in communicating with constellation 32. NOC 16 may also control the operation of the satellites in constellation 32. For example, NOC 16 may convey control commands via gateways 14 that control positioning operations (e.g., orbit adjustments), sensing operations (e.g., thermal information gathered using one or more thermal sensors), and/or any other desired operations performed in space by satellites 12. NOC 16, gateways 14, and constellation 32 may be operated or managed by a corresponding satellite constellation operator, for example. The satellite constellation operator may, for example, be the service provider, carrier, and/or administrator of slow network 6B in this implementation where slow network 6B includes a space-based network. Fast network 6A may have a service provider, carrier, and/or administrator that is different from the satellite constellation operator.

Communications system 8 may also include a satellite communications (satcom) network service provider (e.g., a satcom network carrier or operator) for controlling wireless communications between UE device 10 and recipient device 2 (or other communication terminals on Earth) via constellation 32. The satcom network service provider may be a different entity than the satellite constellation operator that controls/operates NOC 16, gateways 14, and constellation 32 and may be a different entity than the service provider, carrier, and/or administrator of fast network 6A, for example. This is illustrative and non-limiting and, if desired, a single entity may control, operator, manage, and/or administer two or more of slow network 6B, fast network 6A, and wireless communications between UE device 10 and recipient device 2 via constellation 32.

One or more gateways 14 may control the operations of constellation 32 over corresponding radio-frequency communications links. Constellation 32 may include any desired number of satellites 12 (e.g., two satellites, four satellites, ten satellites, dozens of satellites, hundreds of satellites, thousands of satellites, etc.), three of which are shown in FIG. 1. If desired, two or more of the satellites in constellation 32 may convey radio-frequency signals between each other using satellite-to-satellite (e.g., relay) links.

The satellites 12 in constellation 32 may include a set of one or more non-geostationary orbit (NGSO) satellites (e.g., communications satellites in non-geostationary orbits). If desired, the satellites 12 in constellation 32 may also include a set of one or more geostationary orbit (GSO) satellites 12G (e.g., satellites in geostationary/geosynchronous orbits, sometimes referred to as geosynchronous satellites or GEO satellites). NGSO satellites in constellation 32 move relative to the surface of Earth over time (e.g., at velocities V relative to the surface of Earth). GSO satellites in constellation 32 (e.g., GSO satellites 12G) do not move relative to the surface of Earth (e.g., GSO satellites 12G may orbit around Earth at a velocity that matches the rotation of Earth given the altitude of the satellites).

The GSO satellites 12G in constellation 12 may orbit Earth at orbital altitudes of greater than around 30,000 km. The NGSO satellites 12 in constellation 32 may include low earth orbit (LEO) satellites at orbital altitudes of less than around 8,000 km (e.g., satellites in low earth orbits, inclined low earth orbits, low earth circular orbits, etc.), medium earth orbit (MEO) satellites at orbital altitudes between around 8,000 km and 30,000 km (e.g., satellite in medium earth orbits), sun synchronous satellites (e.g., satellites in sun synchronous orbits), satellites in tundra orbits, satellites in Molniya orbits, satellites in polar orbits, and/or satellites in any other desired non-geosynchronous orbits around Earth. If desired, satellites 12 may include multiple sets of satellites each in a different type of orbit and/or each at a different orbital altitude. In general, constellation 32 may include satellites in any desired combination of orbits or orbit types.

The satellites 12 (e.g., NGSO satellites and/or GSO satellites 12G) in constellation 32 may communicate with one or more UE devices on Earth such as UE device 10 using one or more radio-frequency communications links (e.g., satellite-to-user equipment links). Satellites 12 may also communicate with gateways 14 on Earth using radio-frequency communications links (e.g., satellite-to-gateway links). Radio-frequency signals (e.g., radio-frequency signals 4B of FIG. 1) may be conveyed between UE device 10 and satellite(s) 12 and between satellite(s) 12 and gateway(s) 14 to support the satellite-to-user equipment links, the satellite-to-gateway links, and relay links between satellites. The radio-frequency signals may be conveyed in IEEE bands such as the IEEE C band (4-8 GHZ), S band (2-4 GHZ), L band (1-2 GHZ), X band (8-12 GHz), W band (75-110 GHz), V band (40-75 GHZ), K band (18-27 GHZ), $K_a$ band (26.5-40 GHZ), $K_u$ band (12-18 GHz), and/or any other desired satellite communications bands. If desired, different bands may be used for the satellite-to-user equipment links than for the satellite-to-gateway links.

Communications may be performed between gateway(s) 14 and UE device 10 in a forward (FWD) link direction and/or in a reverse (REV or RWD) link direction. In the forward link direction (sometimes referred to simply as the forward link), wireless data is conveyed from a gateway 14 to UE device 10 via constellation 32. For example, a gateway 14 may transmit forward link data to one of the satellites 12 in constellation 32 (e.g., using radio-frequency signals 28). Satellite 12 may transmit (e.g., relay) the forward link data received from gateway 14 to UE device 10 (e.g., using radio-frequency signals 26). Radio-frequency signals 28 are conveyed in an uplink direction from gateway 14 to satellite 12 and may therefore sometimes be referred to herein as uplink (UL) signals 28, forward link UL signals 28, or forward link signals 28. Radio-frequency signals 26 are conveyed in a downlink direction from satellite 12 to UE device 10 and may therefore sometimes be referred to herein as downlink (DL) signals 26, forward link DL signals 26, or forward link signals 26.

In the reverse link direction (sometimes referred to simply as the reverse link), wireless data is transmitted by UE device 10 to gateway 14 via constellation 32. For example, one of the UE devices 10 may transmit reverse link data to one of the satellites 12 in constellation 32 using radio-frequency signals 24 and satellite 12 may transmit (e.g., relay) the reverse link data received from UE device 10 to a corresponding gateway 14 using radio-frequency signals 30. Radio-frequency signals 24 are conveyed in an uplink direction from UE device 10 to satellite 12 and may therefore sometimes be referred to herein as uplink (UL) signals 24, reverse link UL signals 24, or reverse link signals 24. Radio-frequency signals 30 are conveyed in a downlink direction from satellite 12 to gateway 14 and may therefore sometimes be referred to herein as downlink (DL) signals 30, reverse link DL signals 30, or reverse link signals 30. Gateway 14 may forward wireless data between UE device 10 and network portion 18. Network portion 18 may forward the wireless data to any desired network nodes or terminals, such as recipient device 2. One or more satellites 12 may, for example, relay wireless data and/or radio-frequency signals (e.g., radio-frequency signals 4B of FIG. 1) between UE device 10 and one or more gateways 14 in a bent pipe configuration (e.g., without fully receiving or decoding wireless data from the radio-frequency signals). If desired, satellites 12 may also actively generate and transmit other information in DL signals 30 (e.g., information other than wireless data relayed from gateway(s) 14). Such information may include reference signals and synchronization signals (e.g., system synchronization and information blocks), paging signals, physical random access channel (PRACH) messages or responses, physical downlink shared channel (PDSCH) messages, etc.

If desired, UE device 10 may also convey radio-frequency signals with a wireless device 22 in fast network 6A over terrestrial wireless communication link 36 when fast network 6A is available to UE device 10. UE device 10 and wireless device 22 may convey radio-frequency signals 4A (FIG. 1) to support wireless communication link 36. UE device 10 may sometimes be referred to herein as being "online" or "on-grid" when the UE device is within range (e.g., the coverage area) of a wireless device 22 in fast network 6A and when fast network 6A provides access (e.g., communications resources) to network portion 18 for UE device 10. This may sometimes also be referred to herein as fast network 6A being "available" to UE device 10. When the UE device 10 is online, UE device 10 may communicate with other network nodes or terminals in network portion 18 (e.g., recipient device 2) via terrestrial network wireless communication link 36.

Conversely, UE device 10 may sometimes be referred to herein as being "offline" or "off-grid" when the UE device 10 is out of range of any wireless devices 22 in fast network 6A or when fast network 6A otherwise does not provide access to network portion 18 for UE device 10 (e.g., when wireless devices 22 are disabled due to a power outage, natural disaster, traffic surge, or emergency, when wireless devices 22 deny access to network portion 18 for UE device 10, when wireless devices 22 are overloaded with traffic, etc.). This may sometimes also be referred to herein as fast network 6A being "unavailable" to UE device 10.

If desired, UE device 10 may include separate antennas for handling communications over the satellite-to-user equipment link and terrestrial network wireless communication link 36 or UE device 10 may include a single antenna that handles both the satellite-to-user equipment link and the terrestrial network wireless communications link. Terrestrial network wireless communication link 36 may be, for example, be a cellular telephone link (e.g., a link maintained using a cellular telephone communications protocol such as a 4G Long Term Evolution (LTE) protocol, a 3G protocol, a 3GPP Fifth Generation (5G) New Radio (NR) protocol, etc.), a wireless local area network link (e.g., Wi-Fi® and/or Bluetooth links), etc.

In general, the size of the coverage area of each wireless device 22 and each satellite 12 is a function of at least transmit power level, radio-frequency path loss, line-of-sight obstacles, distance, and frequency. Each satellite 12 may, for example, exhibit a larger overall coverage area than each wireless device 22. On the other hand, since satellites 12 are located in space, the resources (e.g., processing and power resources) of slow network 6B are extremely limited and generally require the launch of new or additional satellites 12 to expand service capacity and/or speed in relaying communications for UE device 10. Constellation 32 can therefore only support wireless data transfer at relatively low maximum speeds (e.g., data rate DR2 and/or bandwidth BW2 of FIG. 1). As such, constellation 32 may form an ideal backup or failover wireless network for UE device 10 to use to communicate with recipient device 2 when (while) fast network 6A is unavailable to UE device 10.

The wireless data conveyed in DL signals 26 may sometimes be referred to herein as DL data, forward link DL data, or forward link data. UL signals 28 may also convey the forward link data (e.g., forward link data that is routed by satellite 12 to UE device 10 in DL signals 26). The wireless data conveyed in UL signals 24 may sometimes be referred to herein as UL data, reverse link UL data, or reverse link data. The reverse link data may be generated by UE device 10. DL signals 30 may also convey the reverse link data. The forward link data may be generated by any desired network nodes or terminals of network portion 18. The forward link data and the reverse link data may include text data such as email messages, text messages, web browser data, an emergency or SOS message, a location message identifying the location of UE device 10, or other text-based data, audio data such as voice data (e.g., for a bi-directional satellite voice call) or other audio data (e.g., streaming satellite radio data), video data (e.g., for a bi-directional satellite video call or to stream video data transmitted by gateway 14 at UE device 10), cloud network synchronization data, one or more files, data generated or used by software applications running on UE device 10, data for use in a distributed processing network, and/or any other desired data. UE device 10 may only receive forward link data, may only transmit reverse link data, or may both transmit reverse link data and receive forward link data. Each satellite 12 may communicate with UE device 10 when located within its respective coverage area (e.g., when UE device 10 is located within cells on Earth that overlap the signal beam(s) producible by the satellite).

The satcom network service provider for communications system 8 may operate, control, and/or manage a satcom control network such as core network (CN) 20 in network portion 18. CN 20 may sometimes also be referred to herein as satcom network region 20, CN region 20, satcom controller 20, satcom network 20, or satcom service provider equipment 20. CN 20 may be implemented on one or more network nodes and/or terminals of network portion 18 (e.g., one or more servers or other end hosts). In some implementations, CN 20 may be formed from a cloud computing network distributed over multiple underlying physical network nodes and/or terminals distributed across one or more geographic regions. CN 20 may therefore sometimes also be referred to herein as a CN cloud region or satcom network cloud region.

CN 20 may control and coordinate wireless communications between terminals of network portion 18 and UE devices such as UE device 10 via satellite constellation 32 and/or fast network 6A. When a gateway 14 receives reverse link data from UE device 10 via satellite constellation 32, the gateway may route the reverse link data to CN 20. CN 20 may perform any desired processing operations on the reverse link data. For example, CN 20 may identify destinations for the reverse link data and may forward the reverse link data to the identified destinations (e.g., to recipient device 2, which may be separate from CN 20 or which may form a part of CN 20 if desired). CN 20 may also receive forward link data for transmission to UE device 10 from one or more terminals (end hosts) of network portion 18. CN 20 may process the forward link data to schedule the forward link data for transmission to UE device 10 via satellite constellation 32. CN 20 may schedule the forward link data for transmission to multiple UE devices by generating forward link traffic grants for each of the UE devices that are to receive forward link data. CN 20 may provide the forward link data and the forward link traffic grants to gateways 14. Gateways 14 may transmit the forward link data to UE devices via satellite constellation 32 according to the forward link traffic grants (e.g., according to a forward link communications schedule that implements the forward link traffic grants). CN 20 may include, be coupled to, and/or be associated with one or more content delivery networks (CDNs) that provide content for delivery to UE device such as UE device 10, if desired.

UE device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, a wireless base station or access point, equipment that implements the functionality of two or more of these devices, or other electronic equipment. Recipient device 2 may be another UE device or may be any other desired terminal or end host of network portion 18 (e.g., a server, cloud computing region, etc.).

Figure 3:
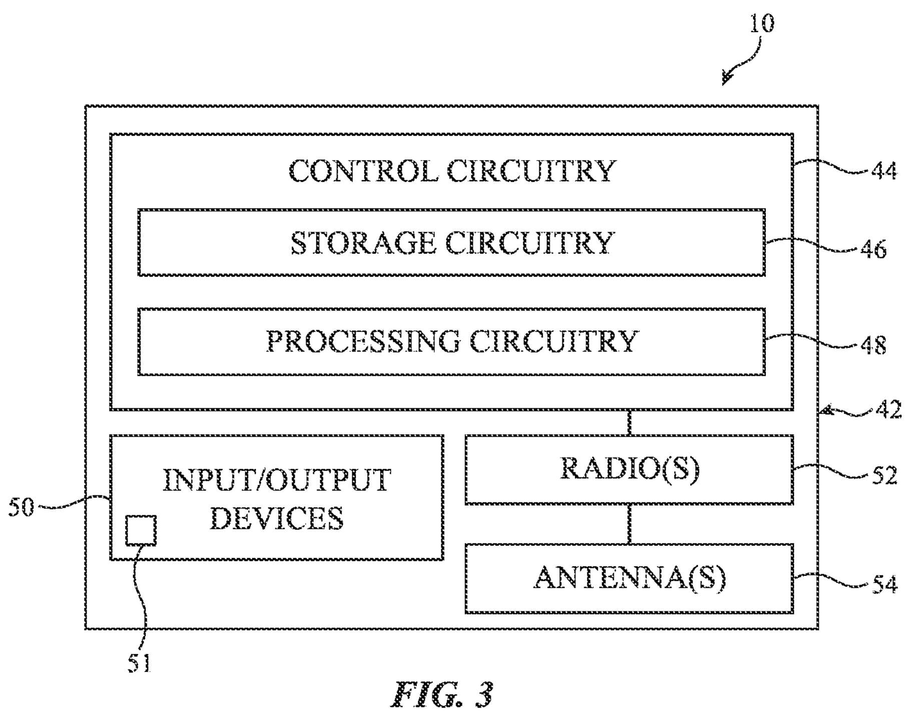
FIG. 3 is a schematic diagram of an illustrative user equipment device in accordance with some embodiments.

As shown in FIG. 3, UE device 10 (sometimes referred to herein simply as user equipment 10 or device 10) may include components located on or within an electronic device housing such as housing 42. Housing 42, which may sometimes be referred to as a case, may be formed of plastic, glass, ceramics, fiber composites, metal (e.g., stainless steel, aluminum, metal alloys, etc.), other suitable materials, or a combination of these materials. In some situations, part or all of housing 42 may be formed from dielectric or other low-conductivity material (e.g., glass, ceramic, plastic, sapphire, etc.). In other situations, housing 42 or at least some of the structures that make up housing 42 may be formed from metal elements.

UE device 10 may include control circuitry 44. Control circuitry 44 may include storage such as storage circuitry 46. Storage circuitry 46 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 46 may include storage that is integrated within UE device 10 and/or removable storage media.

Control circuitry 44 may include processing circuitry such as processing circuitry 48. Processing circuitry 48 may be used to control the operation of UE device 10. Processing circuitry 48 may include on one or more processors such as microprocessors, microcontrollers, digital signal processors, host processors, baseband processor integrated circuits, application specific integrated circuits, central processing units (CPUs), graphics processing units (GPUs), etc. Control circuitry 44 may be configured to perform operations in device 10 using hardware (e.g., dedicated hardware or circuitry), firmware, and/or software. Software code for performing operations on UE device 10 may be stored on storage circuitry 46 (e.g., storage circuitry 46 may include non-transitory (tangible) computer readable storage media that stores the software code). The software code may sometimes be referred to as program instructions, software, data, instructions, or code. Software code stored on storage circuitry 46 may be executed by processing circuitry 48.

Control circuitry 44 may be used to run software on UE device 10 such as satellite navigation applications, internet browsing applications, voice-over-internet-protocol (VOIP) telephone call applications, email applications, media playback applications, operating system functions, etc. To support interactions with external equipment, control circuitry 44 may be used in implementing communications protocols. Communications protocols that may be implemented using control circuitry 44 include internet protocols, wireless local area network (WLAN) protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols (e.g., ultra-wideband protocols), cellular telephone protocols (e.g., 3G protocols, 4G (LTE) protocols, 5G protocols, etc.), antenna diversity protocols, satellite navigation system protocols (e.g., global positioning system (GPS) protocols, global navigation satellite system (GLONASS) protocols, etc.), antenna-based spatial ranging protocols (e.g., radio detection and ranging (RADAR) protocols or other desired range detection protocols for signals conveyed at millimeter and centimeter wave frequencies), satellite communications protocols, or any other desired communications protocols. Each communications protocol may be associated with a corresponding radio access technology (RAT) that specifies the physical connection methodology used in implementing the protocol.

UE device 10 may store satellite information associated with one or more of the satellites 12 in satellite constellation 32 on storage circuitry 46. The satellite information, sometimes referred to herein as ephemeris data, may include a satellite almanac identifying the orbital parameters/position (e.g., orbit information, elevation information, altitude information, inclination information, eccentricity information, orbital period information, trajectory information, right ascension information, declination information, ground track information, etc.) and/or the velocity of satellites 12 (e.g., relative to the surface of Earth). This information may include a two-line element (TLE), for example. The TLE may identify (include) information about the orbital motion of one or more of the satellites 12 in satellite constellation 32 (e.g., satellite epoch, first and/or second derivatives of motion, drag terms, etc.). The TLE may be in the format of a text file having two lines or columns that include the set of elements forming the TLE, for example. Control circuitry 44 may use the ephemeris data to calculate, predicting, or identifying the location of satellites 12 at a given point in time.

UE device 10 may also include wireless circuitry that supports wireless communications. The wireless circuitry may include one or more antennas 54 and one or more radios 52. Each radio 52 may include circuitry that operates on signals at baseband frequencies (e.g., baseband processor circuitry), signal generator circuitry, modulation/demodulation circuitry (e.g., one or more modems), radio-frequency transceiver circuitry (e.g., radio-frequency transmitter circuitry, radio-frequency receiver circuitry, mixer circuitry for downconverting radio-frequency signals to baseband frequencies or intermediate frequencies between radio and baseband frequencies and/or for upconverting signals at baseband or intermediate frequencies to radio-frequencies, etc.), amplifier circuitry (e.g., one or more power amplifiers and/or one or more low-noise amplifiers (LNAs)), analog-to-digital converter (ADC) circuitry, digital-to-analog converter (DAC) circuitry, control paths, power supply paths, signal paths (e.g., radio-frequency transmission lines, intermediate frequency transmission lines, baseband signal lines, etc.), switching circuitry, filter circuitry, and/or any other circuitry for transmitting and/or receiving radio-frequency signals using antenna(s) 54. The components of each radio 52 may be mounted onto a respective substrate or integrated into a respective integrated circuit, chip, package, or system-on-chip (SOC). If desired, the components of multiple radios 52 may share a single substrate, integrated circuit, chip, package, or SOC.

Antenna(s) 54 may be formed using any desired antenna structures. For example, antenna(s) 54 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. If desired, one or more antennas 54 may include antenna resonating elements formed from conductive portions of housing 42 (e.g., peripheral conductive housing structures extending around a periphery of a display on UE device 10). Filter circuitry, switching circuitry, impedance matching circuitry, and/or other antenna tuning components may be adjusted to adjust the frequency response and wireless performance of antenna(s) 54 over time. If desired, multiple antennas 54 may be implemented as a phased array antenna (e.g., where each antenna forms a radiator or antenna element of the phased array antenna, which is sometimes also referred to as a phased antenna array). In these scenarios, the phased array antenna may convey radio-frequency signals within a signal beam. The phases and/or magnitudes of each radiator in the phased array antenna may be adjusted so the radio-frequency signals for each radiator constructively and destructively interfere to steer or orient the signal beam in a particular pointing direction (e.g., a direction of peak signal gain). The signal beam may be adjusted or steered over time.

Transceiver circuitry in radios 52 may convey radio-frequency signals using one or more antennas 54 (e.g., antenna(s) 54 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna(s) 54 may transmit the radio-frequency signals by radiating the radio-frequency signals into free space (or to free space through intervening device structures such as a dielectric cover layer). Antenna(s) 54 may additionally or alternatively receive the radio-frequency signals from free space (e.g., through intervening devices structures such as a dielectric cover layer). The transmission and reception of radio-frequency signals by antenna(s) 54 each involve the excitation or resonance of antenna currents on an antenna resonating element in the antenna by the radio-frequency signals within the frequency band(s) of operation of the antenna.

Each radio 52 may be coupled to one or more antennas 54 over one or more radio-frequency transmission lines. The radio-frequency transmission lines may include coaxial cables, microstrip transmission lines, stripline transmission lines, edge-coupled microstrip transmission lines, edge-coupled stripline transmission lines, transmission lines formed from combinations of transmission lines of these types, etc. The radio-frequency transmission lines may be integrated into rigid and/or flexible printed circuit boards if desired. One or more of the radio-frequency lines may be shared between radios 52 if desired. Radio-frequency front end (RFFE) modules may be interposed on one or more of the radio-frequency transmission lines. The radio-frequency front end modules may include substrates, integrated circuits, chips, or packages that are separate from radios 52 and may include filter circuitry, switching circuitry, amplifier circuitry, impedance matching circuitry, radio-frequency coupler circuitry, and/or any other desired radio-frequency circuitry for operating on the radio-frequency signals conveyed over the radio-frequency transmission lines.

Radios 52 may use antenna(s) 54 to transmit and/or receive radio-frequency signals within different frequency bands at radio frequencies (sometimes referred to herein as communications bands or simply as a "bands"). The frequency bands handled by radios 52 may include satellite communications bands (e.g., the C band, S band, L band, X band, W band, V band, K band, $K_a$ band, $K_u$ band, etc.), wireless local area network (WLAN) frequency bands (e.g., Wi-Fi® (IEEE 802.11) or other WLAN communications bands) such as a 2.4 GHZ WLAN band (e.g., from 2400 to 2480 MHZ), a 5 GHZ WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHZ Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHZ, 5G New Radio Frequency Range 2 (FR2) bands between 20 and 60 GHZ, 6G bands, etc.), other centimeter or millimeter wave frequency bands between 10-300 GHz, near-field communications (NFC) frequency bands (e.g., at 13.56 MHZ), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, and/or any other desired frequency bands of interest.

While control circuitry 44 is shown separately from radios 52 in the example of FIG. 3 for the sake of clarity, radios 52 may include processing circuitry that forms a part of processing circuitry 48 and/or storage circuitry that forms a part of storage circuitry 46 of control circuitry 44 (e.g., portions of control circuitry 44 may be implemented on radios 52). As an example, control circuitry 44 may include baseband circuitry or other control components that form a part of radios 52. The baseband circuitry may, for example, access a communication protocol stack on control circuitry 44 (e.g., storage circuitry 46) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer.

UE device 10 may include input-output devices 50. Input-output devices 50 may be used to allow data to be supplied to UE device 10 and to allow data to be provided from UE device 10 to external devices. Input-output devices 50 may include user interface devices, data port devices, and other input-output components. For example, input-output devices 50 may include touch sensors, displays such as display 51 (e.g., a touch-sensitive and/or force-sensitive display, sometimes also referred to as a touch screen), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), temperature sensors, etc. In some configurations, keyboards, headphones, displays, pointing devices such as trackpads, mice, and joysticks, and other input-output devices may be coupled to device 10 using wired or wireless connections (e.g., some of input-output devices 50 may be peripherals that are coupled to a main processing unit or other portion of device 10 via a wired or wireless link). UE device 10 may be owned and/or operated by an end user.

Figure 4:
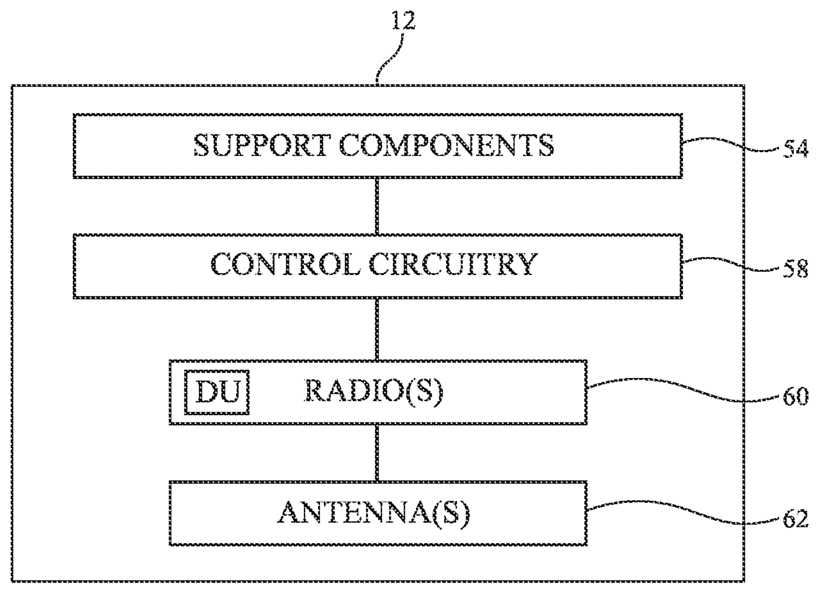
FIG. 4 is a schematic diagram of an illustrative communications satellite in a space-based wireless network in accordance with some embodiments.

FIG. 4 is a diagram of an illustrative satellite 12 in constellation 32. As shown in FIG. 4, satellite 12 may include satellite support components 56. Support components 56 may include batteries, solar panels, sensors (e.g., accelerometers, gyroscopes, temperature sensors, light sensors, etc.), guidance systems, propulsion systems, and/or any other desired components associated with supporting satellite 12 in orbit above Earth.

Satellite 12 may include control circuitry 58. Control circuitry 58 may be used in controlling the operations of satellite 12. Control circuitry 58 may include processing circuitry such as processing circuitry 48 of FIG. 3 and may include storage circuitry such as storage circuitry 46 of FIG. 3. Control circuitry 58 may also control support components 56 to adjust the trajectory or position of satellite 12 in space.

Satellite 12 may include antennas 62 and one or more radios 60. Radios 60 may use antennas 62 to transmit DL signals 26 and DL signals 30 and to receive UL signals 24 and UL signals 28 of FIG. 1 (e.g., in one or more satellite communications bands). Radios 60 may include transceivers, modems, integrated circuit chips, application specific integrated circuits, filters, switches, up-converter circuitry, down-converter circuitry, analog-to-digital converter circuitry, digital-to-analog converter circuitry, amplifier circuitry (e.g., multiport amplifiers), beam steering circuitry, etc.

The communication functions of satellite 12 and a corresponding gateway 14 may be characterized by radio unit (RU) functions, distributed unit (DU) functions, and control unit (CU) functions. The RU functions include low level functions (e.g., PHY functions) associated with radio-frequency transmission and reception. The DU functions (sometimes referred to simply as the DU) involve all functions linked to data communications/transfer between the UE devices and satellite 12 such as radio link control (RLC) functions, packet data convergence protocol (PDCP) functions, service data adaptation protocol (SDAP) functions (e.g., functions that effectively form a pipeline for data transfer), physical layer (PHY) functions, and media access control (MAC) functions. The CU functions (sometimes referred to simply as the CU) are responsible for control configuration for communications such as radio resource control (RRC) functions, PDCP-C functions, CU-CP functions, etc. The DU and the CU may, for example, be defined by the Open RAN standards for cellular radio-access networks.

Rather than simply relaying data transmitted by gateway 14 or UE device 10, satellite 12 may also generate and transmit some information to UE devices 10. Such information may include reference signals and synchronization signals (e.g., system synchronization and information blocks), paging signals, PRACH messages or responses, PDSCH messages, etc. Radios 60 may implement DU functions for the transmission of this information, whereas gateway 14 may retain the CU functions for transmission of the information by satellite 12. Radios 60 may include hardware that implements the DU functions (e.g., signal generators, transmitters, modulators, mixers, amplifiers, etc.).

Antennas 62 may include any desired antenna structures (e.g., patch antenna structures, dipole antenna structures, monopole antenna structures, waveguide antenna structures, Yagi antenna structures, inverted-F antenna structures, cavity-backed antenna structures, combinations of these, etc.).

In one suitable arrangement, antennas 62 may include one or more phased array antennas. Each phased array antenna may include beam forming circuitry having a phase and magnitude controller coupled to each antenna element in the phased array antenna. The phase and magnitude controllers may provide a desired phase and magnitude to the radio-frequency signals conveyed over the corresponding antenna element. The phases and magnitudes of each antenna element may be adjusted so that the radio-frequency signals conveyed by each of the antenna elements constructively and destructively interfere to produce a radio-frequency signal beam (e.g., a spot beam) in a desired pointing direction (e.g., an angular direction towards Earth at which the radio-frequency signal beam exhibits peak gain). Radio-frequency lenses may also be used to help guide the radio-frequency signal beam in a desired pointing direction. Each radio-frequency signal beam also exhibits a corresponding beam width. This allows each radio-frequency signal beam to cover a corresponding area on Earth (e.g., a region on Earth overlapping the radio-frequency signal beam such that the radio-frequency signal beam exhibits a power greater than a minimum threshold value within that region/cell). Satellite 12 may convey radio-frequency signals over multiple concurrently-active signal beams if desired. If desired, satellite 12 may offload some or all of its beam forming operations to gateway 14. The signal beams may sometimes be referred to herein simply as beams.

If desired, radios 60 and antennas 62 may support communications using multiple polarizations. For example, radios 60 and antennas 62 may transmit and receive radio-frequency signals with a first polarization (e.g., a left-hand circular polarization (LHCP)) and may transmit and receive radio-frequency signals with a second polarization (e.g., a right-hand circular polarization (RHCP)). Antennas 62 may be able to produce a set of different signal beams at different beam pointing angles (e.g., where each beam overlaps a respective cell on Earth). The set of signal beams may include a first subset of signal beams that convey LHCP signals (e.g., LHCP signal beams) and a second subset of signal beams that convey RHCP signals (e.g., RHCP signal beams). The LHCP and RHCP signal beams may, for example, be produced using respective multiport power amplifiers (MPAs) on satellite 12. This is merely illustrative and, in general, satellite 12 may produce any desired number of signal beams having any desired polarizations.

Figure 5:
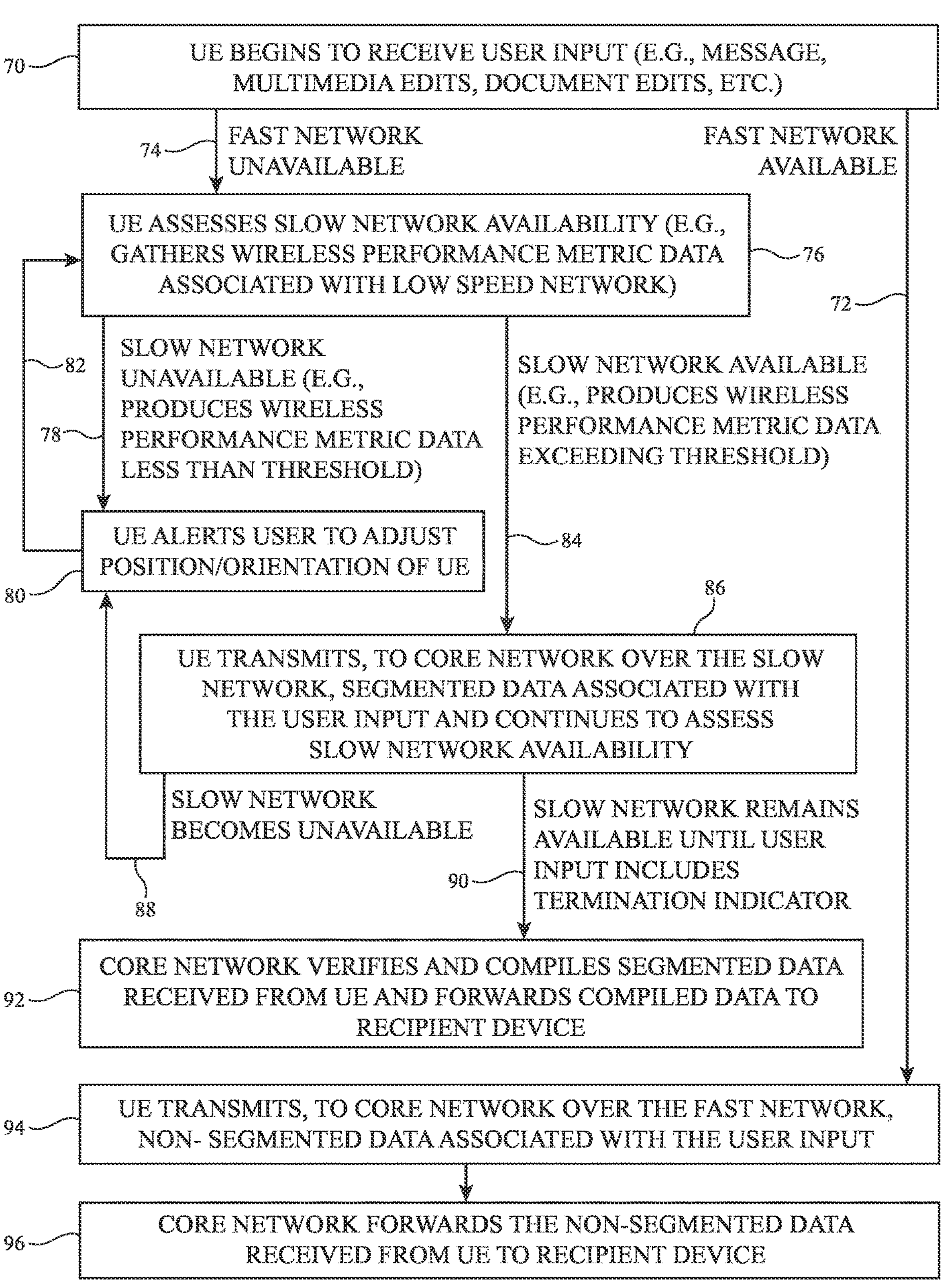
FIG. 5 is a flow chart of illustrative operations involved in transmitting data from a user equipment device to a recipient device in accordance with some embodiments.

FIG. 5 is a flow chart of operations that may be performed by communications system 8 to transmit wireless data from UE device 10 to recipient device 2. At operation 70, UE device 10 may begin to receive user input (e.g., using one or more input/output devices 50 of FIG. 3) that is provided by the user or another person to UE device 10. UE device 10 may continue to receive user input while processing operations 70-86 of FIG. 5 if desired.

The user input may include touch screen input, keystrokes, mouse input, voice input, video input, image input, camera input, peripheral device input, game controller input, accessory device input, gesture input, sensor data produced by one or more sensors on UE device 10 in response to one or more actions of a person such as the user of UE device 10, and/or any other desired input produced by the user of UE device 10 in interacting with UE device 10. The user input may produce or may otherwise be associated with a set of wireless data that is intended for transmission by UE device 10 to recipient device 2. The set of wireless data may sometimes be referred to herein simply as data or data to be transmitted.

The set of wireless data may include a series or sequence of bits, bytes, data packets, or other data units of different sizes, etc. In implementations where UE device 10 communicates via constellation 32, UE device 10 may organize the set of wireless data into a series (set) of one or more datagrams. The structure and timing of the datagrams may be given by the communications protocol associated with wireless communications via constellation 32. The set of wireless data may include application data generated by one or more software applications executed by UE device 10. The application(s) may generate the wireless data at least partially in response to, using, based on, or as a function of the user input.

The wireless data may include, as examples, a text or email message that is generated and/or edited by a text or email application based on the user input (e.g., the user input may be text input that the user types onto a keyboard or touchscreen keyboard of UE device 10), a voice recording, message, or other audio data that is generated and/or edited by an audio or call application based on the user input (e.g., the user input may be audio input that is received by a microphone on UE device 10), a video recording, message, or other video or image data that is generated and/or edited by a video capture, video call, or camera application based on the user input (e.g., the user input may be an image or video captured by a camera or image sensor on UE device 10), application data indicating a status or state of UE device 10 and/or the user of UE device 10 (e.g., as generated in response to a user input or selection identifying a status or state of the user or UE device 10, such as a status identifier identifying the user as being safe or identifying the user as being in need of help), an edited image, video, or other multimedia data generated by an image, video, or multimedia editing, creating, or processing application based on the user input (e.g., the user input may be a modification, filter, or edit to an image, video, or other multimedia stored on UE device 10), a file (e.g., text file, slideshow file, spreadsheet file, database file, PDF file, document, etc.) generated and/or edited by a file creation, editing, or processing application based on the user input (e.g., the user input may be the creation, modification, or editing of the file), a slideshow or presentation that is generated and/or edited based on the user input (e.g., the user input may be the creation of one or more visual elements, animations, transitions, text, graphics, etc. in a slideshow or presentation file), a financial transaction command or request generated by a financial transaction application based on the user input (e.g., the user input may be a command to transfer a particular amount of funds or value to a recipient or a request to receive a particular amount of funds or value from a sender), and/or any other wireless data generated created at least partially by or in response to the user input. These examples are illustrative and non-limiting.

UE device 10 may then transmit or begin to transmit the wireless data to CN 20 for forwarding to recipient device 2 (e.g., the software application that produces the wireless data based on the user input may provide the wireless data to baseband circuitry, which provides the wireless data to radio(s) 52 for transmission over antenna(s) 54 of FIG. 3). The wireless network that is used to relay or forward the wireless data from UE device 10 to CN 20 may depend on the availability of fast network 6A. Since fast network 6A exhibits higher peak speed, bandwidth, data rate, and/or capacity than slow network 6B, UE device 10 may transmit the wireless data over fast network 6A whenever possible so as to minimize the time required for the UE device to transmit the wireless data and for the wireless data to be successfully received by recipient device 2.

If, when, or while fast network 6A is available to UE device 10, processing may proceed to operation 92 via path 72. Fast network 6A may be available to UE device 10 when UE device 10 is within the coverage area (cell) of an active wireless device 22 of fast network 6A (FIG. 2), UE device 10 is registered with (to) fast network 6A, fast network 6A provides access to UE device 10, the service level available at fast network 6A exceeds a minimum threshold service level (e.g., based on the current or expected future traffic load of fast network 6A), and/or the wireless performance of UE device 10 in communicating with at least one of the wireless devices 22 in fast network 6A exceeds a threshold level (e.g., when radio-frequency propagation conditions between UE device 10 and wireless device 22 exceed a threshold level, when wireless performance metric data gathered by UE device 10 and/or wireless device 22 from radio-frequency signals 4A conveyed between UE device 10 and wireless device 22 exceed a threshold level, etc.).

As used herein, the term "wireless performance metric data" refers to measurements or values of one or more wireless performance metrics (e.g., key performance indicators (KPI's)) that are generated by radio-frequency circuitry (e.g., receiver circuitry, transmitter circuitry, coupler circuitry, impedance measurement circuitry, radio-frequency sensor circuitry, etc.) and/or processing circuitry (e.g., baseband circuitry, an application processor, etc.) in response to, using, or based on transmitted and/or received radio-frequency signals and/or the wireless data conveyed by the radio-frequency signals. The wireless performance metric data may characterize the radio-frequency propagation conditions or channel conditions of the radio-frequency signals and/or the wireless performance of wireless circuitry on UE device 10, wireless devices 22, and/or satellites 12 in conveying radio-frequency signals and/or wireless data. The wireless performance metric data may include, as examples, received power levels, transmit power levels, received signal strength indicator (RSSI) values, reference signal received power (RSRP) values, received signal code power (RSCP) information, error rate values (e.g., bit error rate values, frame error rate values, block error rate values, etc.), quality factor (Q) values, adjacent channel leakage ratio (ACLR) values or other spectral measurement values, error vector magnitude (EVM) values, receiver sensitivity values, noise floor values or other signal noise levels, signal-to-noise ratio (SNR) values, signal-to-interference-and-noise ratio (SINR) values, Ec/IO data, Ec/No data, combinations of these and/or other values, and/or measurements of any other desired wireless performance metrics, criteria, or indicators.

At operation 94 (e.g., responsive to fast network 6A being available to UE device 10). UE device 10 may transmit the complete set of wireless data associated with the user input (e.g., generated by the software application based on the user input) to a wireless device 22 in fast network 6A (e.g., using radio-frequency signals 4A of FIG. 1). UE device 10 may hold off on transmitting the set of wireless data while the UE device continues to receive user input and may then transmit the complete set of wireless data after the user input has included or identified a termination indicator instructing the UE device to proceed with transmitting the data to recipient device 2. The user may include or identify the termination indicator by pressing a graphical button presented by a graphical user interface (GUI) displayed by UE device 10 (e.g., a graphical "send," "transmit," "finished," "complete," or similar button), by providing a voice control input instructing the UE device to proceed with sending the data, by providing a gesture control input instructing the UE device to proceed with sending the data, or by providing any other user input that instructs the software application to proceed with transmitting the data or that otherwise indicates to the software application that the user has finished providing user input. Additionally or alternatively, the software application may include the termination indicator in the data or may autonomously transmit or begin transmitting the data (e.g., without an additional user input instructing the device to transmit the data) periodically or in response to any desired trigger event.

The complete set of wireless data transmitted by UE device 10 may, for example, be non-segmented data that is continuously transmitted by UE device 10 until all of the data has been acknowledged by fast network 6A. The complete set of wireless data may, as examples, include an entire text message, email, audio (voice) stream, video stream, image file, video file, presentation, slideshow, file, or other data generated by the software application based on the user input (e.g., including any and all edits to the file as provided by the user input).

Fast network 6A may forward, route, relay, and/or convey the complete set of wireless data to CN 20 (FIG. 2). At operation 96, CN 20 may process header and routing information in the wireless data to identify recipient device 2 and may forward, route, relay, or otherwise convey the wireless data to recipient device 2 (e.g., over one or more wireless and/or wired links, over intervening network segments or portions, over the Internet, etc.). Once the wireless data has been successfully delivered to (received by) recipient device 2, CN 20 may transmit a delivery confirmation or acknowledgement message to UE device 10 over fast network 6A to inform UE device 10 and/or the user of UE device 10 that the wireless data has been successfully delivered to (received by) recipient device 2.

On the other hand, if, when, or while fast network 6A is unavailable to UE device 10, processing may proceed from operation 70 to operation 76 via path 74. Fast network 6A may be unavailable to UE device 10 when or while UE device 10 is outside the coverage area (cell) of any active wireless device 22 of fast network 6A (FIG. 2), UE device 10 is not registered with or connected to fast network 6A, fast network 6A refuses or is unable to provide access to UE device 10, the service level available at fast network 6A is less than a minimum threshold service level (e.g., based on the current or expected future traffic load of fast network 6A), and/or the wireless performance of UE device 10 in communicating with the wireless devices 22 of fast network 6A is less than a threshold level (e.g., when radio-frequency propagation conditions between UE device 10 and wireless device 22 are less than a threshold level, when wireless performance metric data gathered by UE device 10 and/or wireless device 22 from radio-frequency signals 4A conveyed between UE device 10 and wireless device 22 are less than a threshold level, etc.).

At operation 76 (e.g., responsive to fast network 6A being unavailable to UE device 10), UE device 10 may begin to assess, analyze, or detect the availability of slow network 6B for conveying wireless data associated with the user input to recipient device 2. If desired, operation 76 may be performed concurrently with operation 70. UE device 10 may, for example, gather wireless performance metric data from radio-frequency signals 4B conveyed between UE device 10 and one or more nodes of slow network 6B (e.g., DL signals 26 and/or UL signals 24 conveyed between UE device 10 and one or more satellites 12 of FIG. 2). UE device 10 may determine, identify, or detect that slow network 6B is available if, when, or while UE device 10 is able to connect to one or more of the nodes of slow network 6B and/or if, when, or while the wireless performance metric data exceeds a threshold value. UE device 10 may determine, identify, or detect that slow network 6B is unavailable if, when, or while UE device 10 is unable to connect to the nodes of slow network 6B and/or if, when, or while the wireless performance metric data is less than the threshold value.

If, when, or while slow network 6B is unavailable to UE device 10 (e.g., when the wireless performance metric data is less than the threshold value), processing may proceed to operation 80 via path 78. In general, there may be at least one node in slow network 6B (e.g., at least one satellite 12 in constellation 32) that has a coverage area overlapping the location of UE device 10 at all or nearly all times. However, given the long path length between UE device 10 and the nodes of slow network 6B (e.g., satellites 12) and the limited transmit power levels and receiver sensitivities of UE device 10 and the nodes of slow network 6B, the availability of slow network 6B to UE device 10 may depend on the orientation of UE device 10 relative to the nodes of slow network 6B. UE device 10 may, for example, have one or more antennas that exhibit a radiation pattern or response that is/are more sensitive in some directions than others (e.g., given the geometry and placement of the antenna(s) on the UE device).

As such, responsive to UE device 10 detecting or determining that slow network 6B is unavailable, the UE device (e.g., one or more of input/output devices 50 of FIG. 3) may issue an alert to the user of UE device 10 instructing the user to physically move or rotate (e.g., tilt) UE device 10 in an attempt to better align the response of the antenna(s) on the UE device to the angular location of a node of slow network 6B (at operation 80). UE device 10 may continue to gather wireless performance metric data while the user moves or rotates UE device 10 to determine whether moving or rotating the UE device has caused slow network 6B to become available to the UE device (e.g., processing may loop back to operation 76 via path 82).

The alert may include a visual alert (e.g., an indicator light or one or more graphical elements presented on a graphical user interface of a display on UE device 10), an audio alert (e.g., verbal instructions to the user), and/or a haptic alert (e.g., a vibration or other tactile indicator). Consider one example in which slow network 6B includes constellation 32 of FIG. 2 and in which the alert is presented by a graphical user interface on display 51 of FIG. 3. In this example, display 51 may display a graphical indicator instructing the user to hold UE device 10 upwards and/or pointing towards the sky and/or to move away from overhead obstacles (e.g., to move outside), which serves to better align the response of one or more antennas 54 on the UE device with the locations of satellites 12 in constellation 32 while minimizing line of sight obstacles. If desired, UE device 10 may identify a predicted location of the satellites 12 that are visible to UE device 10 at a particular time (e.g., based on satellite ephemeris data stored on UE device 10) and may provide a graphical indicator (e.g., an arrow or other guiding instructions) that instructs the user to point a portion of UE device 10 towards a predicted location of one or more of the satellites. This may continue until the UE device has determined that slow network 6B is available, until the UE device has connected, registered, or re-connected to slow network 6B, and/or until the wireless performance metric gathered from radio-frequency signals 4B (FIG. 1) have exceeded the threshold value. Alternatively, the display may continue to display the graphical indicator until the UE device has finished transmitting the complete set of wireless data to slow network 6B (e.g., while processing the subsequent operations of FIG. 5), thereby maximizing the likelihood that the slow network will successfully receive the wireless data.

If, when, or while slow network 6B is available to UE device 10 (e.g., when the gathered wireless performance metric data exceeds the threshold value), processing may proceed from operation 76 to operation 86 via path 84. At operation 86 (e.g., responsive to the wireless performance metric data exceeding the threshold value), UE device 10 may use radio-frequency signals 4B (FIG. 1) to transmit the complete set of wireless data for recipient device 2 to slow network 6B as segmented data associated with the user input (e.g., where the complete set of wireless data is divided into discrete data segments). Put differently, rather than transmitting the complete set of wireless data as when fast network 6A is available (e.g., while processing operation 94), UE device 10 may instead transmit the wireless data as a set of two or more discrete data segments (chunks) that are each transmitted at a different respective time. UE device 10 may, for example, transmit data segments corresponding to the user input in real time or periodically as the user provides the user input (e.g., as the user input is being received by UE device 10) and prior to the user input including or identifying the termination indicator. Slow network 6B may forward, route, relay, transmit, or otherwise convey the data segments to CN 20 (FIG. 2). CN 20 may store the data segments as they are received from slow network 6B for further processing.

In other words, UE device 10 may begin to transmit segments of the wireless data generated by the software application based on the user input prior to the user completing entry of the user input (e.g., prior to the user input including or identifying the termination indicator). This may serve to minimize the amount of time the user must wait for the UE device to transmit all of the wireless data and to receive an acknowledgement from CN 20 that all of the wireless data has been successfully received at recipient device 2. In implementations where display 51 continues to display a graphical alert instructing the user of UE device 10 hold the UE device at a particular location or orientation until the wireless data has been transmitted and delivered (e.g., upwards or towards the sky in implementations where slow network 6B includes constellation 32), minimizing the amount of time the user waits for wireless data transmission and acknowledgement may substantially improve user comfort and minimizes the risk that the user will need to rest or move the UE device to a more comfortable but less than optimal position/orientation.

UE device 10 may continue to assess the availability of slow network 6B (e.g., may continue to gather or measure wireless performance metric data) while processing operation 86. If or when slow network 6B becomes unavailable (e.g., if or when the gathered wireless performance metric data falls below the threshold level), processing may loop back to operation 80 via path 88. Alternatively, UE device 10 may continue to provide the alert to the user until all of the segmented wireless data has been transmitted. Once the user input includes or identifies the termination indicator and all of the data segments have been transmitted (e.g., if the slow network has remained available for transmission of all of the data segments until the user input includes or identifies the termination indicator), processing may proceed to operation 92 via path 90.

At operation 92 (e.g., responsive to the data segments including the termination indicator or other information indicative of UE device 10 having completed the transmission of data segments such as a UE device signature), CN 20 may verify the validity of each of the stored data segments. CN 20 may compile or package the data segments to reconstruct or recover the complete set of wireless data, sometimes referred to herein as reconstructed, recovered, compiled, or packaged wireless data (e.g., the complete set of wireless data that would otherwise be transmitted as non-segmented data when fast network 6A is available). CN 20 may then process header and routing information from the data segments to identify recipient device 2 and may forward, route, relay, or otherwise convey the compiled (e.g., recovered, reconstructed, or packaged) wireless data to recipient device 2 (e.g., over one or more wireless and/or wired links, over intervening network segments or portions, over the Internet, etc.).

The example of FIG. 5 is illustrative and non-limiting. Alternatively, UE device 10 may transmit the entire set of wireless data to slow network 6B as non-segmented data while processing operation 86 (e.g., when communications via slow network 6B produce wireless performance metric data exceeding an additional threshold that is even higher than the threshold associated with path 84). Operations 94 and 96 may be omitted if desired. Two or more of operations 70-92 may be performed concurrently. If desired, UE device 10 may continue to monitor the availability of fast network 6A (e.g., may continue to gather wireless performance metric data from radio-frequency signals 4A) while processing operations 76-92. If or when fast network 6A becomes available to UE device 10 while processing any of operations 76-92 (e.g., if or when the wireless performance metric data gathered from radio-frequency signals 4A exceeds the corresponding threshold), processing may jump to operation 94 to use fast network 6A to transmit some or all of the wireless data instead of slow network 6B, if desired.

In this way, UE device 10 may segment the complete set of wireless data associated with the user input, proactively transmitting data segments to slow network 6B as each data segment becomes available (e.g., as the software application generates each data segment based on or responsive to user input as the user input is received by UE device 10) while, concurrent with, or responsive to slow network 6B being available to UE device 10 or otherwise exhibiting a connectivity level, a wireless performance level, or wireless performance metric data that exceeds a first threshold value and while, concurrent with, or responsive to fast network 6A being unavailable or otherwise exhibiting a connectivity level, a wireless performance level, or wireless performance metric data that is less than a second threshold value. This may serve to optimize wireless communications for UE device 10 in transmitting wireless data to recipient device 2 (e.g., minimizing the time a user must wait for successful transmission and delivery of the complete set of wireless data) under a wide range of different operating environments and/or conditions in which fast network 6A and/or slow network 6B may or may not be available at any given time.

Figure 6:
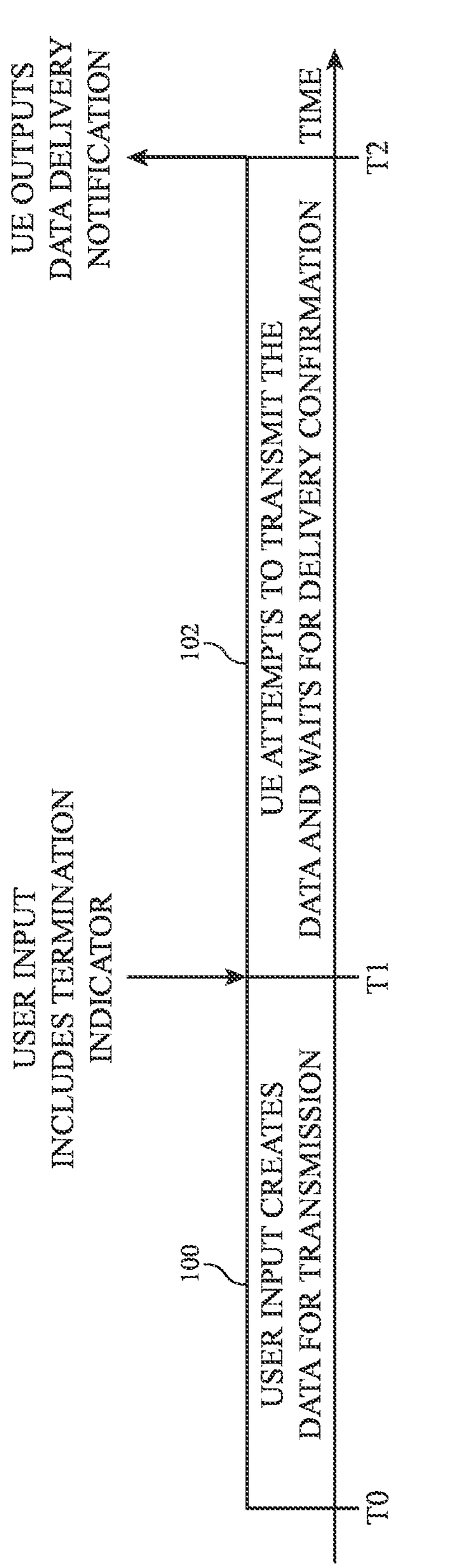
FIG. 6 is a timing diagram showing how an illustrative user equipment device may transmit non-segmented data in accordance with some embodiments.

FIG. 6 is a timing diagram showing one example of how UE device 10 may transmit non-segmented data (e.g., while processing operation 94 of FIG. 5 or while processing operation 86 in an implementation where UE device 10 transmits non-segmented data over slow network 6B). As shown in FIG. 6, at time TO, UE device 10 may begin to receive user input (e.g., while processing operation 70 of FIG. 5). The user may continue to provide user input until time T1.

A software application running on UE device 10 may generate the set of wireless data associated with the user input (e.g., as non-segmented data) between times TO and T1 in real time as the user input is received (during period 100). For example, the software application may generate a message as the user enters or types text into UE device 10. If the user edits an earlier user input, the software application may edit the message based on additional user input that identifies the edit.

At time T1, the user input may include a termination indicator identifying to UE device 10 that the user has completed providing user input. At this time, the software application may transmit the complete set of wireless data (e.g., non-segmented data) to radio 52 for transmission over antenna(s) 54 (FIG. 3). Between times T1 and T2 (during period 102), UE device 10 may encrypt (e.g., sign) the complete set of wireless data and may attempt to transmit the complete set of wireless data to recipient device 2. UE device 10 may wait a predetermined period after transmitting the complete set of wireless data for receipt of a delivery confirmation (acknowledgement) from CN 20, indicating that the non-segmented data has been successfully delivered to recipient device 2. If UE device 10 does not receive the delivery confirmation, UE device 10 may re-transmit the complete set of wireless data. This process may continue until UE device 10 receives the delivery confirmation from CN 20 (e.g., at time T2). Once the UE device has received the delivery confirmation, the UE device may, if desired, produce an output (e.g., a graphical indicator, an audio sound, etc.) to inform the user of UE device 10 that the complete set of wireless data has been successfully delivered to recipient device 2.

In practice, the complete set of wireless data (e.g., the non-segmented data) can be relatively large. In implementations where UE device 10 attempts to transmit the complete set of wireless data (non-segmented data) to slow network 6B between times T1 and T2, the slow speed of slow network 6B and the relatively large size of the non-segmented data may cause UE device 10 to perform several re-transmissions of the complete set of wireless data until the delivery confirmation is received. This may cause the user of UE device 10 to have to wait an excessive amount of time for receipt of the delivery confirmation, which disrupts user experience with UE device 10. Further, in implementations where slow network 6B includes constellation 32 and the user has to hold UE device 10 at a specific orientation and/or position to best align the response of the antenna(s) on UE device 10 to the satellites 12 of constellation 32 (e.g., based on the alert at operation 80), excessive delays before receiving delivery confirmation can be tiring or uncomfortable for the user.

To mitigate these issues, when transmitting the wireless data to slow network 6B (e.g., while processing operation 86 of FIG. 5), UE device 10 may begin to transmit data segments (e.g., subsets of the complete set of wireless data) as the UE device receives user input and prior to receipt of a termination indicator in the user input. In this way, once the user has finished providing user input and the user input includes a termination indicator, the user need only wait for successful transmission of a subset of the complete set of wireless data (e.g., one or more final data segments corresponding to the most recently provided user input) before receiving the delivery confirmation. This shorter delay may help to create a more seamless and easy user experience with UE device 10 and may increase user comfort in implementations where slow network 6B includes constellation 32, for example.

Figure 7:
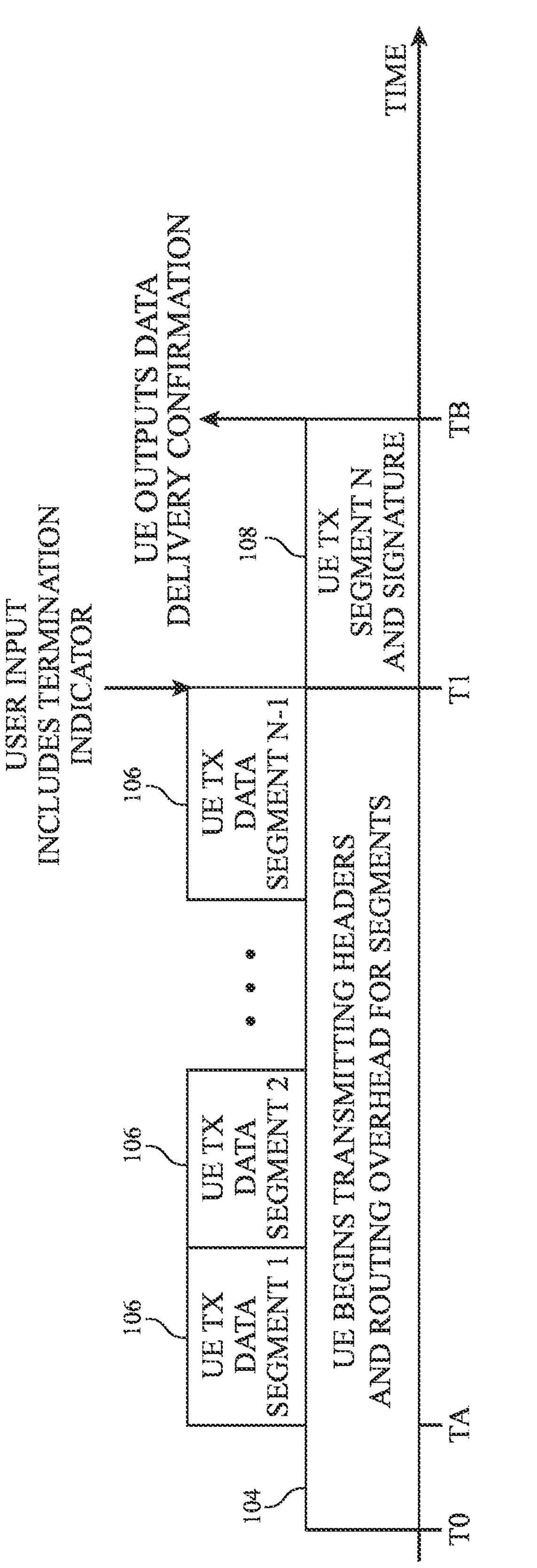
FIG. 7 is a timing diagram showing how an illustrative user equipment device may transmit segmented data in accordance with some embodiments.

FIG. 7 is a timing diagram showing how UE device 10 may transmit non-segmented data to slow network 6B (e.g., while processing operation 86 of FIG. 5). As shown in FIG. 7, at time TO, UE device 10 may begin to receive user input (e.g., while processing operation 70 of FIG. 5). The user may continue to provide user input until time T1.

The software application running on UE device 10 (e.g., executed by an application processor (AP) in processing circuitry 48 of FIG. 3) may begin to generate data segments associated with the user input between times TO and T1 and may continue to generate data segments as the user input is received (during period 104). All of the data segments may collectively include the same data as the complete set of data (e.g., the non-segmented data) that would otherwise be generated by UE device 10 during period 100 and transmitted by UE device 10 during period 102 of FIG. 6. The complete set of data may, for example, correspond to a set of N data segments. However, each data segment represents only a portion, subset, fragment, or chunk of the complete set of data.

Each data segment may include a predetermined number of one or more bits, bytes, or any other units of wireless data (e.g., less than the total amount of data in the complete set of data). The size of each data segment (e.g., the predetermined amount of data in each data segment) may depend on the speed and/or capacity of slow network 6B. If desired, slow network 6B may transmit control signals to UE device 10 that instruct UE device 10 to adjust the size of the data segments over time (e.g., based on the current or expected future traffic load on slow network 6B). Each data segment may include one or more data packets or may include a subset of a data packet. Each data segment may include a single datagram of data, more than one datagram of data, or less than one datagram of data. In implementations where slow network 6B includes constellation 32, the datagram may represent the smallest unit of wireless data transmittable by UE device 10 at a given time or in a given communications cycle (e.g., as determined by the communications protocol associated with the radio-frequency signals conveyed by constellation 32). In implementations where each data segment includes less than one datagram of data, there may be unused or wasted space within the transmitted datagram.

Once UE device 10 has received the predetermined amount of user input corresponding to the size of one data segment, the software application may generate a data segment associated with or including the predetermined amount of user input, may encrypt the data segment, and may transmit the encrypted data segment to radio 52 for transmission over antenna(s) 54 (FIG. 3). The software application may continue to generate data segments, encrypt the data segments, and transmit the encrypted data segments to radio 52 for transmission additional user input is received (e.g., where each data segment is generated after, upon, or in response to reception of the predetermined amount of user input). Beginning at time TA, UE device 10 (e.g., radio 52) may begin to transmit the data segments to slow network 6B. Prior to the user input including the termination indicator, UE device 10 may transmit each data segment during a respective period 106 as additional user input is received and as the corresponding data segments are generated.

Slow network 6B may forward the data segments to CN 20 as each data segment is received from UE device 10. Slow network 6B may transmit one or more acknowledgements (e.g., ACK messages or packets) to UE device 10 for each data segment that is successfully received from UE device 10. If UE device 10 does not receive an acknowledgement for a given data segment within a predetermined amount of time, UE device 10 may re-transmit that data segment until an acknowledgement is received. CN 20 may store each data segment as the data segments are received from slow network 6B.

Prior to time TA and after time TO, UE device 10 may also begin to transmit headers and routing overhead for each of the data segments to slow network 6B (e.g., separately from transmission of the data segments). UE device 10 may, for example, transmit header and routing information prior to the transmission of each corresponding data segment (each period 106) or prior to the transmission of a set of multiple data segments. The headers and routing information may include an identifier that identifies recipient device 2 as the destination for the data segments, an identifier that identifies UE device 10 as the source for the data segments, sequence information identifying the time sequence of each data segment (e.g., identifying where each data segment lies within the complete set of wireless data), a cryptographic key (e.g., the public key of UE device 10), validation certifications, and/or any other desired routing overhead.

Once the user input includes the termination indicator (e.g., a user input indicating that the user has finished providing user input and/or instructing UE device 10 to transmit the wireless data), at time T1, the software application may generate the final data segment based on the most recently received user input (e.g., the Nth data segment of the N data segments that make up the complete set of wireless data), may encrypt the final data segment, may sign the set of wireless data (e.g., the combination of all of N data segments) to generate a UE device signature, and may transmit the final data segment and the UE device signature to slow network 6B for relay to CN 20. The final data segment may, for example, represent a remainder of the complete set of wireless data to be transmitted by the UE device. The final data segment may therefore sometimes be referred to herein as the remainder of the set of wireless data.

Once CN 20 has received the final data segment and the UE device signature, CN 20 may compile all of the data segments stored at CN 20 and may transmit the compiled data (e.g., the complete set of wireless data made up from each of the N data segments) to recipient device 2. Once the compiled data has been successfully delivered to recipient device 2, CN 20 may transmit a delivery confirmation to UE device 10. UE device 10 may receive the delivery confirmation at time TB and may, if desired, generate an output to inform the user that the wireless data was successfully delivered. Since UE device 10 began transmitting data segments prior to the user completing their user input to UE device 10 (e.g., during periods 106 prior to time T1), UE device 10 need only wait from time T1 to time TB (e.g., for period 108) until the delivery confirmation is received. Since only the final data segment is transmitted after time T1 (rather than the entire complete data set as in FIG. 7), period 108 is significantly shorter than period 102 of FIG. 6, which serves to optimize user experience and comfort.

Consider an example in which the complete set of wireless data is a text or email message generated by a text or email messaging application on UE device 10 based on text input that the user provides to UE device 10. In this example, each data segment may include a set of one or more letters, words, sentences, or paragraphs of the text or email message. As another example, the complete set of wireless data may be an image file that includes image edits produced based on one or more commands that the user provides to an image processing or editing application running on UE device 10. In this example, each data segment may represent a portion of the image prior to being edited and then, once the user input includes the termination indicator, the final data segment may include only information identifying the edits to the image that were produced based on the user input. As another example, the complete set of wireless data may be a slideshow that includes additions or edits produced based on one or more commands that the user provides to a slideshow editing application running on UE device 10. In this example, each data segment may represent a portion of the slideshow prior to being edited and then, once the user input includes the termination indicator, the final data segment may include only information identifying the additions or edits to the slideshow that were produced based on the user input. These examples are illustrative and non-limiting. In general, the complete set of wireless data may include any desired data generated based on the user input.

Figure 8:
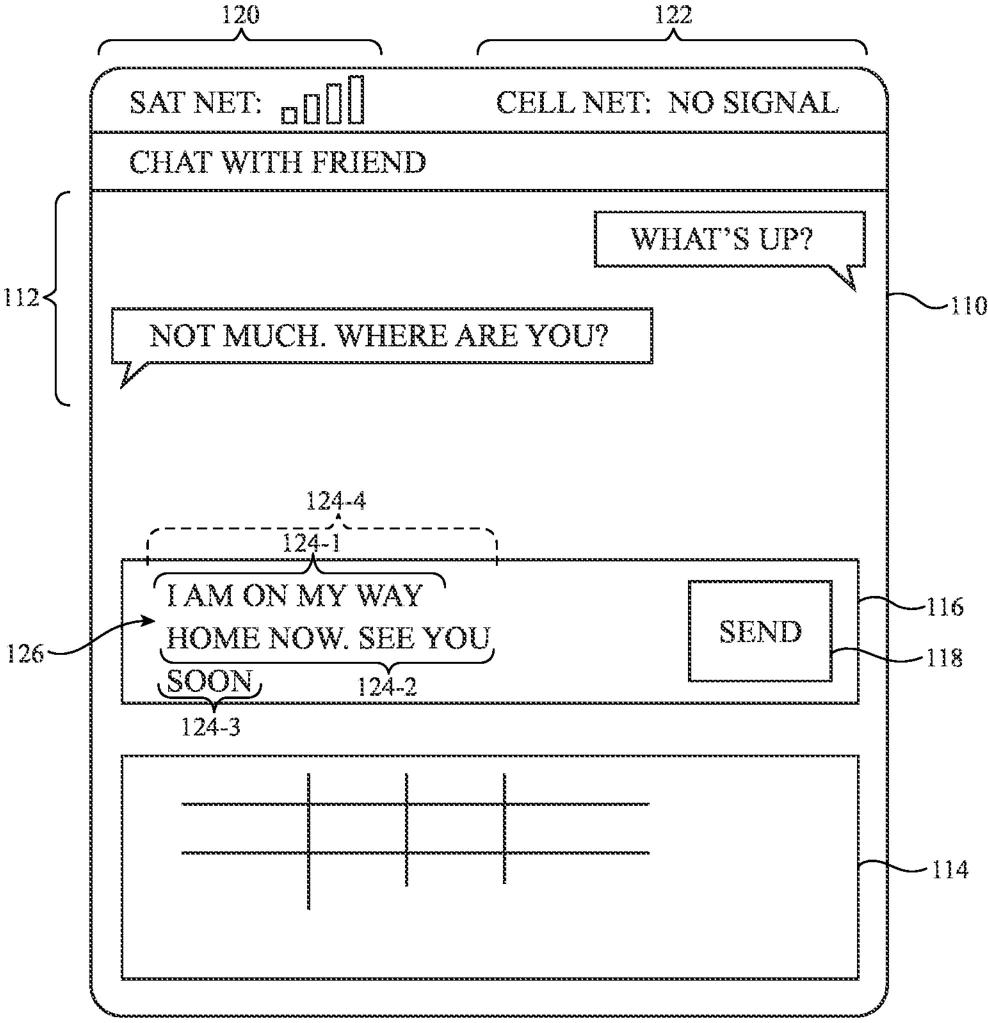
FIG. 8 is a diagram of an illustrative graphical user interface that may be generated by user equipment device to receive a text-based user input that is transmitted by the user equipment device as segmented data in accordance with some embodiments.

To help illustrate how UE device 10 segments the wireless data for transmission over slow network 6B, consider the example in which the complete set of wireless data is a text message generated by a text messaging application on UE device 10 based on text input that the user types into display 51 on UE device 10 (FIG. 3). FIG. 8 shows an example of a graphical user interface that may be displayed on display 51 (FIG. 3) while UE device 10 performs operation 86 of FIG. 5.

As shown in FIG. 8, a graphical user interface (GUI) such as GUI 110 may be displayed on display 51 (e.g., by software such as a text messaging application running on UE device 10). In the example of FIG. 8, GUI 110 displays messages between UE device 10 and another device (e.g., recipient device 2) within text field 112, a graphical keyboard 114 that receives user input as keystrokes that type out a text message 126, a text entry region 116 that displays the text message 126 as the user enters text (user input) using keyboard 114, and a send button 118. If desired, keyboard 114 may be omitted from GUI 110 and the user may use a physical keyboard or any other desired user input device or accessory to enter the text.

Text message 126 may be the complete set of wireless data for transmission to UE device 10 (e.g., during period 102 of FIG. 6). However, when transmitting text message 126 as segmented data (e.g., during periods 106 and 108 of FIG. 7), the text data in text message 126 may be divided into a set of N data segments 124. Each data segment 124 may include a predetermined number of one or more letters, words, lines, or sentences (e.g., a string of predetermined length). In the example of FIG. 8, text message 126 includes N=4 data segments 124 (e.g., a first data segment 124-1, a second data segment 124-2, a third data segment 124-3, etc.).

In this example, the user may begin typing text message 126 using keyboard 114 (e.g., at or after time TO of FIG. 7 and during operation 70 of FIG. 5). Once the user has typed the predetermined amount of data corresponding to each data segment 124, the application may generate a first data segment 124-1 that includes the predetermined amount of data (e.g., the string "I AM ON MY WAY") and may encrypt and transmit data segment 124-1 to slow network 6B (e.g., during a first period 106 of FIG. 7).

As the user continues to enter text into keyboard 114, the application may then generate a second data segment 124-2 that includes the predetermined amount of data (e.g., the string "HOME NOW. SEE YOU") and may encrypt and transmit data segment 124-2 to slow network 6B (e.g., during a second period 106 of FIG. 7). The user may continue to enter text into keyboard 114 (e.g., the string "SOON."). At this point, the user may determine that text message 126 is complete and may press send button 118, which identifies to the software application that the user has finished providing user input and/or instructs the application to transmit text message 126.

In this example, the pressing of send button 118 serves as or generates the termination indicator in the user input received by UE device 10. In general, any desired user input may act as or may serve to produce the termination indicator in the user input received by UE device 10. The application may then encrypt and transmit data segment 124-3 to slow network 6B as the final data segment, along with the UE device signature (e.g., during period 108 of FIG. 7). Once CN 20 receives the UE device signature (indicating that data segment 124-3 represents the final data segment of text message 126), CN 20 may compile or package data segments 124-1, 124-2, and 124-3 to reconstruct text message 126 and may transmit text message 126 to recipient device 2 (e.g., while processing operation 92 of FIG. 5). Since each data segment 124 is encrypted by UE device 10 prior to transmission, slow network 6B and CN 20 may be unable to identify or discover the content of data segments 124, thereby preserving user privacy.

In some situations, the user input provided to the application may include an edit to previously entered data in text message 126 prior to the user input including the termination indicator (e.g., prior to the user pressing send button 118). For example, after entering the string of data segment 124-3, the user may decide to edit or update the previously-entered string of data segment 124-1 displayed in text entry region 116 before sending text message 126 to recipient device 2 (e.g., to correct a typographical error, add a word, delete a word, etc.). After the user has provided user input to edit the string of data segment 124-1, the application may then generate an additional data segment 124-4 that includes the edited string.

If desired, the application may add an edit flag to data segment 124-4, thereby labeling data segment 124-4 as an edited data segment. The edit flag may identify that data segment 124-4 is an edited or updated version of a previously transmitted data segment and may, if desired, identify which previously transmitted data segment has been edited (e.g., the edit flag may identify that data segment 124-4 is an edited version of data segment 124-1).

UE device 10 may encrypt and transmit data segment 124-4 to slow network 6B (e.g., prior to the user pressing send button 118 or after the user has pressed send button 118 if data segment 124-4 represents the final data segment of text message 126). CN 20 may use the edit flag of data segment 124-4 to identify an earlier-received data segment to replace with data segment 124-4 (e.g., data segment 124-1) and may then discard the earlier-received (outdated) data segment (e.g., data segment 124-1) prior to compiling the data segments and transmitting the compiled data segments (e.g., text message 126) to recipient device 2. If desired, the transmission of each data segment 124 may occur in the background (e.g., without any indication presented on GUI to inform the user that UE device 10 has begun pre-emptively transmitting portions of text message 126).

Once the user has pressed send button 118, the application may move text message 126 to text field 112. Once UE device 10 has received a delivery confirmation from CN 20 (e.g., at time T2 of FIG. 7), GUI 110 may display a graphical indicator or message (e.g., a "MESSAGE DELIVERED" message) (not shown) to inform the user that text message 126 has been successfully received at recipient device 2.

If desired, GUI 110 may also display a first graphical connectivity indicator 120 associated with slow network 6B (e.g., satellite network) and a second graphical connectivity indicator 122 associated with fast network 6A (e.g., cellular network). Indicator 120 may, for example, identify the signal strength, connectivity level, and/or wireless performance metric data associated with wireless communications using slow network 6B. Indicator 122 may, for example, identify the signal strength, connectivity level, and/or wireless performance metric data associated with wireless communications using fast network 6A. As shown in the example of FIG. 8, fast network 6A is unavailable (e.g., "NO SIGNAL") whereas slow network 6B is available. The example of FIG. 8 is illustrative and non-limiting. In general, GUI 110 may display any desired information in any desired manner.

Figure 9:
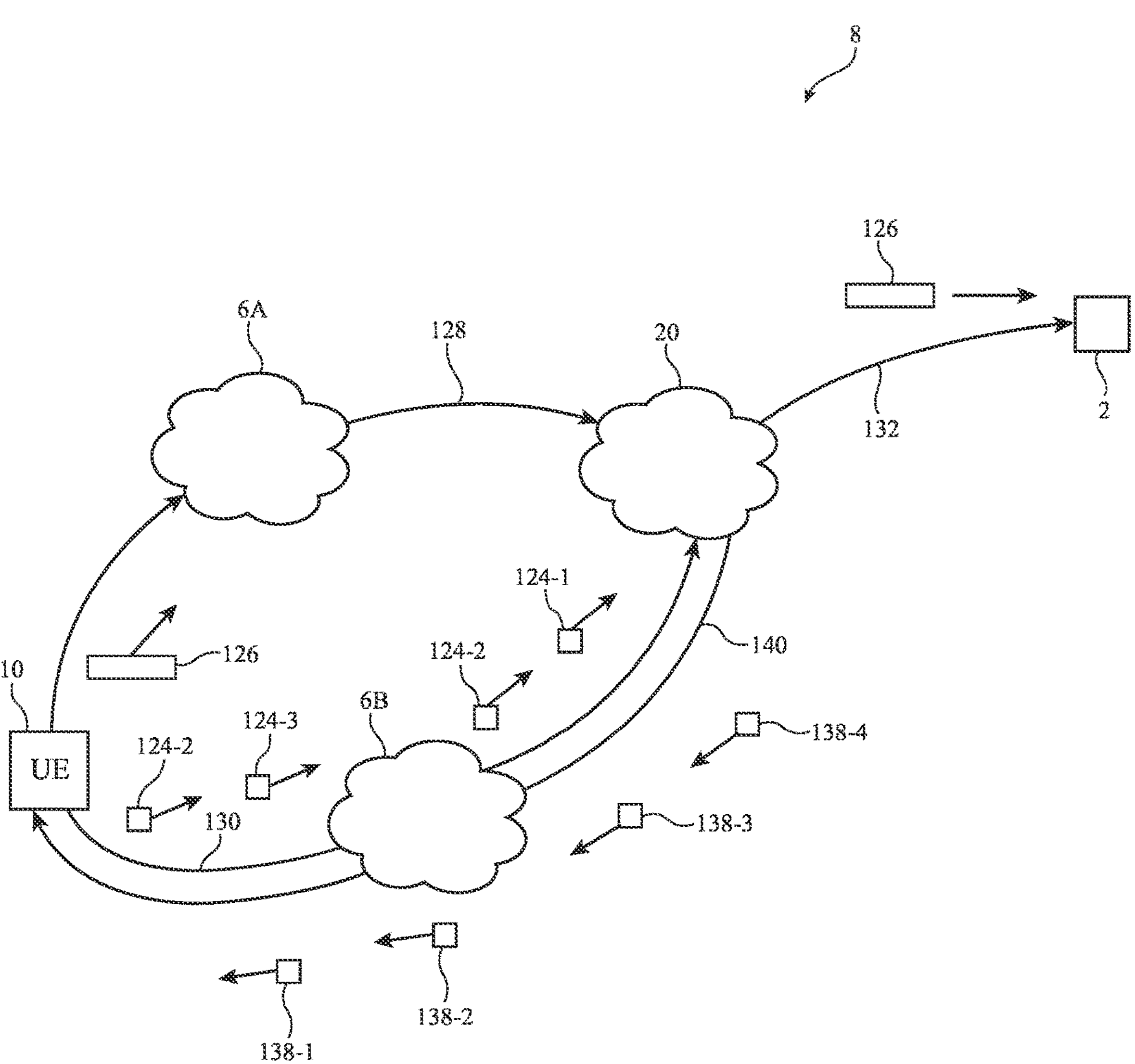
FIG. 9 is a diagram showing how an illustrative user equipment device may transmit segmented data to a recipient device via a core network and wireless networks of different speeds in accordance with some embodiments.

FIG. 9 is a diagram illustrating how UE device 10 may transmit text message 126 of FIG. 8 to recipient device 2. While FIG. 9 illustrates the example where the complete set of wireless data for transmission is text message 126, UE device 10 may transmit any desired wireless data in the manner shown in FIG. 9.

As shown by arrow 128 of FIG. 9, when fast network 6A is available, UE device 10 may transmit text message 126 as a singular, complete set of non-segmented (un-segmented) data to CN 20 via fast network 6A (e.g., during period 102 of FIG. 6 and while processing operation 94 of FIG. 5). CN 20 may forward text message 126 as the singular, complete set of non-segmented data to recipient device 2.

On the other hand, as shown by arrow 130, when fast network 6A is unavailable and slow network 6B is available (e.g., while processing operation 86 of FIG. 5), UE device 10 may transmit data segment 124-1 at a first time to CN 20 via slow network 6B (e.g., during a first period 106 of FIG. 7). As shown by arrow 140, CN 20 and/or slow network 6B may transmit acknowledgements 138 for each data segment 124 as each data segment 124 is received at CN 20 and/or slow network 6B. As such, CN 20 and/or slow network 6B may transmit acknowledgement 138-1 to data segment-1 124 to UE device 10 after the first time. At a second time after the first time, UE device 10 may transmit data segment 124-2 to CN 20 via slow network 6B (e.g., during a second period 106 of FIG. 7). CN 20 and/or slow network 6B may transmit acknowledgement 138-2 to data segment 124-2 to UE device 10 after the second time.

At a third time after the second time, UE device 10 may transmit data segment 124-3 to CN 20 via slow network 6B (e.g., during a third period 106 of FIG. 7). CN 20 and/or slow network 6B may transmit acknowledgement 138-3 to data segment 124-3 to UE device 10 after the second time. At a fourth time after the third time, UE device 10 may transmit data segment 124-4 and the UE device signature to CN 20 via slow network 6B (e.g., during period 108 of FIG. 7). CN 20 and/or slow network 6B may transmit acknowledgement 138-4 to data segment 124-4 to UE device 10 after the second time. CN 20 may store data segments 124 as the data segments are received from slow network 6B. UE device 10 may transmit one or more of segments 124-1 through 124-4 prior to the user input including the termination indication (e.g., while UE device 10 continues to receive user input from the user).

Once CN 20 has received segment 124-4 and the UE device signature, CN 20 may compile, reconstruct, or assemble data segments 124-1 through 124-4 to generate or recover text message 126 (e.g., where text message 126 represents the compiled or assembled data segments). CN 20 may, for example, replace data segment 124-1 with data segment 124-4 (e.g., discarding data segment 124-1 based on the edit flag in data segment 124-4), may use the header and routing information transmitted by UE device 10 (not shown in FIG. 9) to identify where to place each data segment to reconstruct text message 126, and may transmit the reconstructed text message 126 to recipient device 2, as shown by arrow 132. The reconstructed text message 126 may include, for example, data segment 124-4 (since data segment 124-1 became outdated and was replaced by data segment 124-4), followed by data segment 124-2, followed by data segment 124-3. When recipient device 2 successfully receives text message 126, CN 20 may transmit a delivery confirmation to UE device 10 via slow network 6B, as shown by arrow 140.

Figure 10:
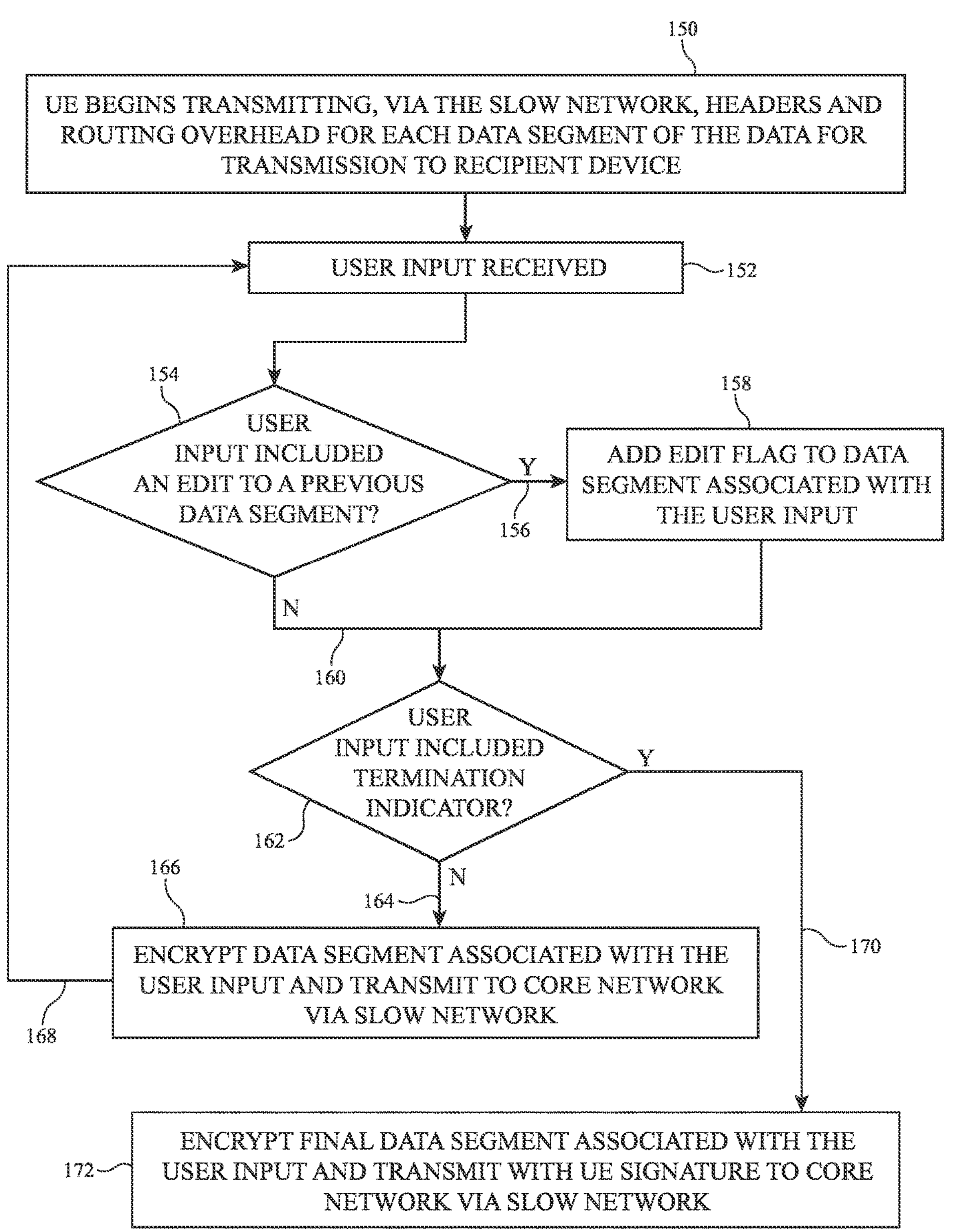
FIG. 10 is a flow chart of illustrative operations that may be performed by a user equipment device to transmit segmented data in accordance with some embodiments.

FIG. 10 is a flow chart of illustrative operations that may be performed by UE device 10 to transmit segmented data to recipient device 2 via slow network 6B and CN 20. UE device 10 may, for example, perform the operations of FIG. 10 while processing operation 86 of FIG. 5. Operations described herein as being performed by an application executed by processing circuitry 48 of UE device 1 (FIG. 3) may equivalently be referred to as being performed by processing circuitry 48 (e.g., one or more processors on the UE device).

At operation 150, UE device 10 may begin transmitting headers and routing overhead for data segments 124 to CN 20 via slow network 6B (e.g., during period 104 of FIG. 7). UE device 10 may continue to transmit headers and routing overhead for data segments 124 concurrent with one or more of operations 152-172 if desired (e.g., operation 150 may be performed concurrently with one or more of operations 152-172).

At operation 152, UE device 10 may receive a user input up to the predetermined size of data segment 124. The application processing the user input may generate the data segment 124 corresponding to the user input. This data segment 124 may sometimes be referred to herein as the data segment associated with or corresponding to the user input (e.g., the user input received during the current iteration of operations 152-166). In the example of FIG. 8, for instance, UE device 10 may receive the text string associated with data segment 124-1 as the user input and may then generate data segment 124-1 (e.g., a data segment containing the string "I AM ON MY WAY" in the messaging example of FIG. 8).

At operation 154, the application processing the user input may determine, identify, or detect whether the user input includes an edit to a previous data segment 124 transmitted by UE device 10 during the current communication session (e.g., during a previous iteration of operations 152-166 that occurred after the transmission of the last complete set of wireless data by UE device 10). If the user input does not include an edit, processing may proceed to operation 162 over path 160. If the user input includes an edit, processing may proceed to operation 158 via path 156.

At operation 154 (e.g., responsive to the user input including an edit to a previously transmitted data segment 124), the application processing the user input may add an edit flag to the data segment 124 associated with the user input. The edit flag may include a single bit, a set of bits, a single byte, a set of bytes, or any other desired amount of data in the data segment and/or in the header and routing overhead for the data segment. A single bit may be sufficient for the edit flag to identify whether the data segment is an edited data segment or not, whereas additional bits may be needed to identify which data segment the edited data segment is intended to update or replace. Processing may then proceed to operation 162.

At operation 162, the application processing the user input may determine, identify, or detect whether the user input includes or is otherwise associated with a termination indicator. In other words, the application may determine whether the user has instructed UE device 10 to proceed with transmitting the complete set of wireless data or has otherwise indicated that the user has finished providing user input. In the messaging implementation of FIG. 8, the application may determine or identify whether the user has pressed send button 118 on GUI 110, as one example. If the user input includes or is associated with a termination indicator, processing may proceed to operation 172 via path 170. If the user input does not include or is not associated with a termination indicator, processing may proceed to operation 166 via path 164.

At operation 166 (e.g., responsive to the user input not including or being associated with the termination indicator, thereby indicating to the application that the user is not finished providing user input), UE device 10 may encrypt the data segment 124 associated with the user input. UE device 10 may transmit the encrypted data segment to CN 20 over slow network 6B. Processing may then loop back to operation 152 via path 168 as additional user input is received by UE device 10 (e.g., for generating and transmitting data segments 124-2, 124-3, and 124-4 in the messaging example of FIG. 8). While receipt of user input is illustrated as a discrete operation 152 in FIG. 10 for the sake of clarity, UE device 10 may continue to receive user input concurrent with operations 154-166 until the user input includes or is associated with a termination indicator (e.g., where operation 152 is performed once an amount of user input is received corresponding to the size of data segments 124).

At operation 172 (e.g., responsive to the user input including or being associated with the termination indicator, thereby indicating to the application that the user has finished providing user input), UE device 10 may encrypt the final data segment 124 associated with the user input (e.g., during period 108 of FIG. 7). UE device 10 may sign wireless data to generate a UE device signature (e.g., by signing the entire set of wireless data that includes all of the data segments). UE device 10 may transmit the encrypted final data segment and the UE device signature to CN 20 over slow network 6B. If desired, UE device 10 may re-transmit the data segment(s) at operations 166 and/or 172 until a corresponding acknowledgement 138 (FIG. 9) is received for the data segment(s) from slow network 6B. After transmission of the final data segment 124, UE device 10 may wait (e.g., until time TB of FIG. 7) for receipt of the corresponding delivery confirmation from CN 20.

The example of FIG. 10 is illustrative and non-limiting. In other implementations, UE device 10 may sign each data segment 124 that is transmitted to CN 20 (producing a UE device sub-signature associated with that data segment). UE device 10 may then transmit the UE device sub-signature with its corresponding data segment 124 rather than transmitting the UE device signature for the entire set of wireless data with the final data segment 124. In these implementations, UE device 10 may include a termination flag (e.g., a single bit or other amounts of data) in the final data segment 124 to inform CN 20 that the final data segment is the last data segment of the set of wireless data. Recipient device 2 may use the signature to verify that the received wireless data was actually transmitted by UE device 10. UE device 10 may generate the UE device signature by applying a cryptographic function to a private key of UE device 10, a public key of recipient device 2, and the data segment(s) 124 that were transmitted, for example. Recipient device 2 may validate the received wireless data using its public key and the signature, for example. If desired, a trusted authentication server may distribute keys to each of the devices.

Figure 11:
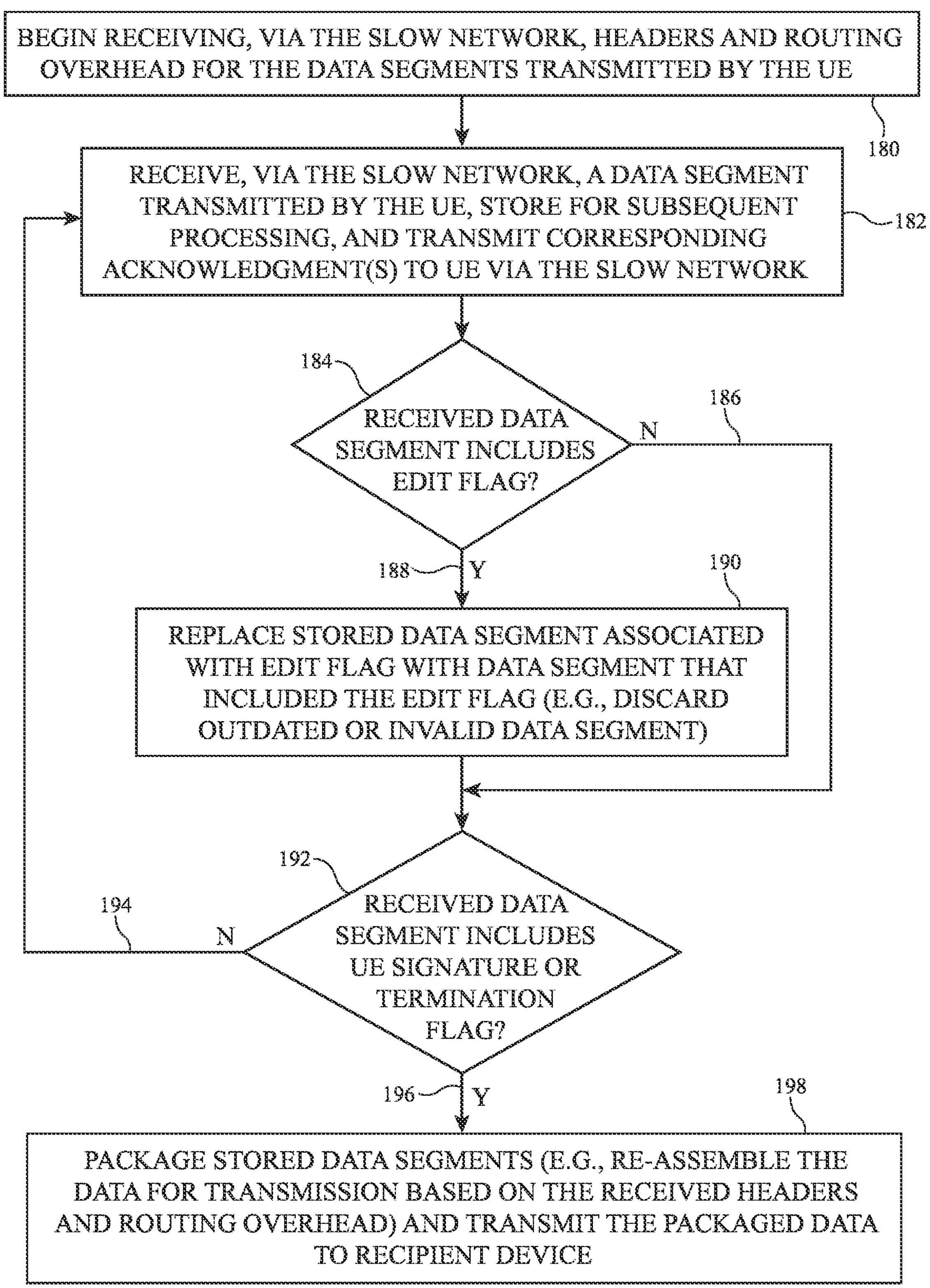
FIG. 11 is a flow chart of illustrative operations that may be performed by a core network to compile and transmit segmented data from a user equipment device to a recipient device in accordance with some embodiments.

FIG. 11 is a flow chart of illustrative operations that may be performed by CN 20 in forwarding the wireless data transmitted by UE device 10 over slow network 6B to recipient device 2. CN 20 may, for example, perform the operations of FIG. 11 while processing operation 92 of FIG. 5.

At operation 180, CN 20 may begin receiving the header and routing overhead transmitted by UE device 10 over slow network 6B. CN 20 may continue to receive headers and routing overhead concurrent with one or more of operations 182-192 if desired (e.g., operation 180 may be performed concurrently with one or more of operations 180-192). CN 20 may store the header and routing overhead on storage circuitry for further processing.

At operation 182, CN 20 may receive the first data segment 124 transmitted by UE device 10 via slow network 6B (e.g., data segment 124-1 in the example of FIGS. 8 and 9). CN 20 may store the data segment on the storage circuitry for further processing. If desired, CN 20 may transmit an acknowledgement 138 of receipt of the data segment to UE device 10 via slow network 6B.

At operation 184, one or more processors on one or more nodes of CN 20 may determine, identify, or detect whether the received data segment 124 includes an edit flag. If the received data segment includes an edit flag, processing may proceed to operation 190 via path 188. If the received data segment does not include an edit flag, processing may proceed to operation 192 via path 186.

At operation 192, the one or more processors on CN 20 may determine, identify, or detect whether the received data segment 124 includes the UE device signature (or a termination flag in implementations where UE device 10 transmits a UE device sub-signature with each data segment). If the received data segment does not include the UE device signature (or a termination flag), this may indicate to CN 20 that UE device 10 still has more data segments to transmit to CN 20 and processing may loop back to operation 182 via path 194. CN 20 may then receive subsequent data segments from UE device 10 via slow network 6B.

If or when a received data segment 124 includes an edit flag, processing may proceed from operation 184 to operation 190 via path 188. At operation 190 (e.g., responsive to the most recently received data segment including an edit flag), the one or more processors on CN 20 may identify which stored data segment the most recently received data segment has edited or is intended to replace. The one or more processors on CN 20 may then discard or delete that data segment and may replace the discarded data segment with the most recently received data segment. In the messaging example of FIG. 8, for instance, the one or more processors on CN 20 may identify that data segment 124-4 includes an edit to data segment 124-1, may replace data segment 124-1 with data segment 124-4, and may discard data segment 124-1. In this way, CN 20 may ensure that any outdated data segments are not packaged in the reconstructed wireless data transmitted to recipient device 2. Processing may then proceed from operation 190 to operation 192.

If the most recently received data segment 124 includes the UE device signature (or a termination flag), this may indicate to CN 20 that UE device 10 has finished transmitting data and processing may proceed from operation 192 to operation 198 via path 196. At operation 198, the one or more processors on CN 20 may package, compile, or otherwise combine all of the stored data segments 124 (e.g., as processed for each iteration of operations 182-192) to generate the complete set of wireless data intended for transmission to recipient device 2 (e.g., text message 126 in the example of FIGS. 8 and 9). The one or more processors on CN 20 may, for example, reassemble or reconstruct the set of wireless data from the stored data segments 124 based at least in part on the headers and routing information, which may include information identifying the intended order or sequence of each data segment 124. CN 20 may then transmit the reassembled, reconstructed, packaged, or compiled (complete) set of wireless data to recipient device 2. When recipient device 2 has successfully received the set of wireless data, CN 20 may transmit a delivery confirmation to UE device 10 via slow network 6B.

Because UE device 10 encrypts each data segment 124 prior to transmission to CN 20, slow network 6B and CN 20 may be unable to read or recover the content of the data segments, thereby preserving user privacy. Put differently, CN 20 may process data segments 124 without validating the UE device signature or decrypting the contents of data segments 124. Instead, recipient device 2 may validate the UE device signature to decrypt, read, and/or recover the content of the data segments (e.g., data segments 124 may be end-to-end encrypted). This is illustrative and non-limiting. Alternatively, for some types of wireless data such as financial transaction data managed by an entity associated with CN 20 itself (e.g., a known entity trusted by UE device 10 and recipient device 2), CN 20 may validate the UE device signature for security purposes (e.g., to verify a financial transaction before executing the financial transaction).

If desired, rather than storing data segments 124, CN 20 may instead forward data segments 124 to recipient device 2 (e.g., over slow network 6B or another 2 network) as the data segments are received at CN 20. This may serve to extend the functions or operations of CN 20 from the nodes (e.g., one or more servers) of CN 20 to recipient device 2. In these implementations, one or more of operations 184-198 may be performed at recipient device 2 instead of CN 20.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as user input or sensor information. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, eyeglasses prescription, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

For one or more aspects, at least one of the components set forth in one or more of the preceding figures may be configured to perform one or more operations, techniques, processes, or methods as set forth herein. For example, the control circuitry as described above in connection with one or more of the preceding figures may be configured to operate in accordance with one or more of the examples set forth herein. For another example, circuitry associated with a UE, satellite, gateway, core network, base station, network element, etc. as described above in connection with one or more of the preceding figures may be configured to operate in accordance with one or more of the examples set forth herein.

In Example 1 a method of operating a user equipment (UE) device to transmit data to a recipient device is provided. The method includes measuring, using a radio, wireless performance metric data from radio-frequency signals conveyed between the UE device and a wireless network; receiving, using an input device, an input associated with the data; transmitting, using the radio, a subset of the data to the wireless network while the wireless performance metric data exceeds a threshold value; and transmitting, using the radio, a remainder of the data to the wireless network after the input device has finished receiving the input.

In Example 2 the method of example 1 or some other example described herein is provided, wherein the wireless network comprises a gateway and a communication satellite configured to forward the data to the gateway.

In Example 3 the method of any of examples 1, 2, or some other example described herein is provided, wherein the input device comprises a touch screen and the input comprises an input received by the touch screen.

In Example 4 the method of any of examples 1-3 or some other example described herein is provided, further comprising: displaying, using the touch screen and concurrent with transmission of the subset of the data, an instruction to place the user equipment device in a particular orientation.

In Example 5 the method of any of examples 1-4 or some other example described herein is provided, wherein the data comprises a message, the input received by the touch screen identifies a string of characters in the message, and the subset of the data comprises a subset of the string of characters.

In Example 6 the method of any of examples 1-5 or some other example described herein is provided, wherein transmitting the remainder of the data to the wireless network after the input device has finished receiving the input comprises transmitting the remainder of the data to the wireless network after the input includes an instruction to transmit the data.

In Example 7 the method of any of examples 1-6 or some other example described herein is provided, wherein the instruction to transmit the data comprises a send button press received at the touch screen.

In Example 8 the method of any of examples 1-7 or some other example described herein is provided, wherein the input comprises a first portion and a second portion received by the input device after the first portion, the method further comprising: transmitting, using the radio, an additional subset of the data to the wireless network while the wireless performance metric data exceeds the threshold value, wherein the remainder of the data corresponds to a third portion of the input received by the input device after the second portion of the input.

In Example 9 the method of any of examples 1-8 or some other example described herein is provided, wherein the second portion of the input comprises an edit to the first portion of the input and the additional subset of the data comprises a flag identifying that the additional subset of the data includes an edit to the first portion of the input.

In Example 10 the method of any of examples 1-9 or some other example described herein is provided, further comprising: generating, using one or more processors, a UE device signature by signing the subset of the data, the additional subset of the data, and the remainder of the data using a cryptographic key associated with the UE device; and transmitting, using the radio, the UE device signature to the wireless network with the remainder of the data.

In Example 11 the method of any of examples 1-10 or some other example described herein is provided, wherein the subset of the data comprises at least some of a file and the remainder of the data comprises an edit to the file.

In Example 12 a method of operating a user equipment (UE) device to transmit data to a recipient device is provided. The method includes conveying, using one or more antennas, radio-frequency signals with a first wireless network having a first maximum speed; receiving, using an input device, a first input associated with the data; concurrent with the first wireless network being unavailable to the UE device, transmitting, using the one or more antennas at a first time, a first segment of the data to a second wireless network having a second maximum speed less than the first maximum speed, the first segment of the data being associated with the first input; receiving, using the input device, a second input associated with the data after receiving the first input; and concurrent with the first wireless network being unavailable to the UE device, transmitting, using the one or more antennas at a second time after the first time, a second segment of the data to the second wireless network, the second segment of the data being associated with the second input.

In Example 13 the method of example 12 or some other example described herein is provided, wherein the first wireless network comprises a terrestrial wireless network and the second wireless network comprises a satellite constellation.

In Example 14 the method of any of examples 12 or 13 or some other example described herein is provided, further comprising: receiving, using the input device, a third input associated with the wireless data after receiving the second input; and transmitting, using the one or more antennas at a third time after the second time, a third segment of the data to the satellite constellation, the third segment of the data being associated with the third input.

In Example 15 the method of any of examples 12-14 or some other example described herein is provided, wherein the third input comprises an edit to the first input and wherein the third segment includes a flag identifying the edit.

In Example 16 the method of any of examples 12-15 or some other example described herein is provided, wherein the second input includes a termination indicator, the third segment is a final segment of the data, and the method further comprises: generating, using one or more processors, a UE device signature based on the first segment, the second segment, and the third segment; and transmitting, using the one or more antennas, the UE device signature to the satellite constellation after the second time.

In Example 17 the method of any of examples 12-16 or some other example described herein is provided, wherein the data comprises a text message, the first segment comprises a first string of the text message, the second segment comprises a second string of the text message, and the third segment comprises a third string of the text message.

In Example 18 an electronic device is provided that includes a touch screen display configured to receive an input associated with wireless data for transmission by the electronic device; a radio configured to convey radio-frequency signals with a cellular network while the cellular network is available to the electronic device; and one or more antennas configured to transmit to a communications satellite, while the cellular network is unavailable to the electronic device, a series of segments of the wireless data prior to the input including a send instruction, and a remainder of the wireless data after the input includes the send instruction.

In Example 19 the electronic device of example 18 or some other example described herein is provided, wherein the series of segments comprises a first text string received by the touch screen display at a first time and a second text string received by the touch screen at a second time after the first time.

In Example 20 the electronic device in any of examples 18 or 19 or some other example described herein is provided, further comprising: one or more processors configured to generate a signature by signing the series of segments and the remainder of the wireless data, the one or more antennas being configured to transmit the signature to the communications satellite after the input includes the send instruction.

In Example 21 a method of operating one or more nodes of a network to transmit data from a user equipment (UE) device to a recipient device is provided. The method can include storing, at storage circuitry, a first segment of the data received via a satellite constellation at a first time, the first segment being generated by the UE device based on a first input received by the UE device; storing, at the storage circuitry, a second segment of the data received via the satellite constellation at a second time after the first time, the second segment being generated by the UE device based on a second input received by the UE device after the first input; generating, using one or more processors, reconstructed data by combining the first segment and the second segment; and transmitting the reconstructed data to the recipient device.

In Example 22 the method of example 21 or some other example described herein is provided, further comprising: receiving, after the second time, a signature of the UE device via the satellite constellation, the reconstructed data being generated after receiving the signature.

In Example 23 the method of any of examples 21 or 22 or some other example described herein is provided, further comprising storing, at the storage circuitry, a third segment of the data received via the satellite constellation at a fourth time different from the first time and the second time; and receiving, after the fourth time, a fourth segment of the data via the satellite constellation, the fourth segment including one or more bits identifying that the fourth segment includes an edit to the third segment.

In Example 24 the method of any of examples 21-23 or some other example described herein is provided, further comprising replacing, using the one or more processors, the third segment stored at the storage circuitry with the fourth segment.

In Example 25 the method of any of examples 21-24 or some other example described herein is provided, further comprising generating, using the one or more processors, the reconstructed data by combining the third segment with the first segment and the second segment.

In Example 26 the method of any of examples 21-25 or some other example described herein is provided, wherein the data comprises text, the first segment comprises a first string of the text, and the second segment comprises a second string of the text after the first string of the text.

In Example 27 the method of any of examples 21-26 or some other example described herein is provided, wherein generating the reconstructed data comprises generating the reconstructed data in response to the second segment including a termination indicator.

In Example 28 the method of any of examples 21-27 or some other example described herein is provided, further comprising: transmitting, to the UE device via the satellite constellation, a first acknowledgement to the first segment of the data; and transmitting, to the UE device via the satellite constellation, a second acknowledgement to the second segment of the data.

In Example 29 a method of operating one or more network nodes to forward data from a user equipment (UE) device to a recipient device is provided, the data being associated with an input received at the UE device. The method includes storing, at storage circuitry, segments of the data received via a communications satellite, each segment being transmitted by the UE device at a different respective time prior to completion of the input at the UE device; generating, using one or more processors, reconstructed data by combining the segments after completion of the input at the UE device; and transmitting the reconstructed data to the recipient device.

In Example 30 the method of example 29 or some other example described herein is provided, further comprising: replacing, using the one or more processors, a segment of the data stored at the storage circuitry with an edited version of the segment received via the communications satellite prior to completion of the input at the UE device.

In Example 31 the method any of examples 29 or 30 or some other example described herein is provided, wherein the edited version of the segment comprises an edit flag.

In Example 32 the method of any of examples 29-31 or some other example described herein is provided, wherein the edit flag identifies the segment of the data to be replaced with the edited version of the segment.

In Example 33 the method of any of examples 29-33 or some other example described herein is provided, wherein the segment of the data to be replaced comprises a text string.

In Example 34 the method of any of examples 29-33 or some other example described herein is provided, wherein a final segment of the data prior to completion of the user input includes a termination flag identifying completion of the input at the UE device.

In Example 35 the method of any of examples 29-34 or some other example described herein is provided, wherein the termination flag comprises a signature of the UE device.

In Example 36 a method of operating one or more nodes of a network is provided. The method includes receiving first data conveyed by a terrestrial wireless network, the first data being transmitted by a user equipment (UE) device while the terrestrial wireless network is available to the UE device; transmitting the first data to a recipient device; receiving second data conveyed by a satellite constellation, the second data being transmitted, by the UE device, in a series of segments while the terrestrial wireless network is unavailable to the UE device; generating, using one or more processors, reconstructed data by compiling the series of segments; and transmitting the reconstructed data to the recipient device.

In Example 37 the method of example 36 or some other example described herein is provided, wherein the first data comprises a first text message, the second data comprises a second text message, and the segments comprise respective strings of the second text message.

In Example 38 the method of any of examples 36 or 37 or some other example described herein is provided, wherein the series of segments are transmitted by the UE device prior to an input to the UE device including a send message instruction.

In Example 39 the method of any of examples 36-38 or some other example described herein is provided, further comprising generating the reconstructed data in response to the second data including a signature of the UE device.

In Example 40 the method of any of examples 36-39 or some other example described herein is provided, further comprising storing, at storage circuitry, the series of segments; and replacing, at the storage circuitry, a segment from the series of segments with an edited version of the segment.

An apparatus (e.g., an electronic user equipment device, a wireless base station, etc.) may be provided that includes means to perform one or more elements of a method described in or related to any of the methods or processes described herein.

One or more non-transitory computer-readable media comprising instructions to cause an electronic device, upon execution of the instructions by one or more processors of the electronic device, to perform one or more elements of any method or process described herein.

An apparatus comprising logic, modules, or circuitry to perform one or more elements of a method described in or related to any of the method or process described herein.

An apparatus comprising: one or more processors and one or more non-transitory computer-readable storage media comprising instructions that, when executed by the one or more processors, cause the one or more processors to perform the method, techniques, or process as described herein.

A signal, datagram, information element, packet, frame, segment, PDU, or message or datagram may be provided as described in or related to any of the examples described herein.

A signal encoded with data, a datagram, IE, packet, frame, segment, PDU, or message may be provided as described in or related to any of the examples described herein.

An electromagnetic signal may be provided carrying computer-readable instructions, wherein execution of the computer-readable instructions by one or more processors is to cause the one or more processors to perform the method, techniques, or process as described in or related to any of the examples described herein.

A computer program comprising instructions, wherein execution of the program by a processing element is to cause the processing element to carry out the method, techniques, or process as described in or related to any of the examples described herein.

A signal in a wireless network as shown and described herein may be provided.

A method of communicating in a wireless network as shown and described herein may be provided.

A system for providing wireless communication as shown and described herein may be provided.

A device for providing wireless communication as shown and described herein may be provided.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A method of operating a user equipment (UE) device to transmit data to a recipient device, the method comprising:

measuring, using a radio, wireless performance metric data from radio-frequency signals conveyed between the UE device and a wireless network;

receiving, using an input device, an input associated with the data, wherein the input comprises a first portion and a second portion received by the input device after the first portion;

transmitting, using the radio, a first subset of the data to the wireless network while the wireless performance metric data exceeds a threshold value;

transmitting, using the radio, a second subset of the data to the wireless network while the wireless performance metric data exceeds the threshold value; and transmitting, using the radio, a remainder of the data to the wireless network after the input device has finished receiving the input, wherein the remainder of the data corresponds to a third portion of the input received by the input device after the second portion of the input.

2. The method of claim 1, wherein the wireless network comprises a gateway and a communication satellite configured to forward the data to the gateway.

3. The method of claim 1, wherein the input device comprises a touch screen and the input comprises an input received by the touch screen.

4. The method of claim 3, further comprising:

displaying, using the touch screen and concurrent with transmission of the first subset of the data, an instruction to place the user equipment device in a particular orientation.

5. The method of claim 3, wherein the data comprises a message, the input received by the touch screen identifies a string of characters in the message, and the first subset of the data comprises a subset of the string of characters.

6. The method of claim 5, wherein transmitting the remainder of the data to the wireless network after the input device has finished receiving the input comprises transmitting the remainder of the data to the wireless network after the input includes an instruction to transmit the data.

7. The method of claim 6, wherein the instruction to transmit the data comprises a send button press received at the touch screen.

8. The method of claim 1, wherein the second portion of the input comprises an edit to the first portion of the input and the second subset of the data comprises a flag identifying that the second subset of the data includes an edit to the first portion of the input.

9. The method of claim 1, further comprising:

generating, using one or more processors, a UE device signature by signing the first subset of the data, the second subset of the data, and the remainder of the data using a cryptographic key associated with the UE device; and transmitting, using the radio, the UE device signature to the wireless network with the remainder of the data.

10. The method of claim 1, wherein the first subset of the data comprises at least some of a file and the remainder of the data comprises an edit to the file.

11. A method of operating a user equipment (UE) device to transmit data to a recipient device, the method comprising:

conveying, using one or more antennas, radio-frequency signals with a first wireless network having a first maximum speed;

receiving, using an input device, a first input associated with the data;

concurrent with the first wireless network being unavailable to the UE device, transmitting, using the one or more antennas at a first time, a first segment of the data to a second wireless network having a second maximum speed less than the first maximum speed, the first segment of the data being associated with the first input;

receiving, using the input device, a second input associated with the data after receiving the first input; and concurrent with the first wireless network being unavailable to the UE device, transmitting, using the one or more antennas at a second time after the first time, a second segment of the data to the second wireless network, the second segment of the data being associated with the second input.

12. The method of claim 11, wherein the first wireless network comprises a terrestrial wireless network and the second wireless network comprises a satellite constellation.

13. The method of claim 12, further comprising:

receiving, using the input device, a third input associated with the wireless data after receiving the second input; and transmitting, using the one or more antennas at a third time after the second time, a third segment of the data to the satellite constellation, the third segment of the data being associated with the third input.

14. The method of claim 13, wherein the third input comprises an edit to the first input and wherein the third segment includes a flag identifying the edit.

15. The method of claim 13, wherein the second input includes a termination indicator, the third segment is a final segment of the data, and the method further comprises:

generating, using one or more processors, a UE device signature based on the first segment, the second segment, and the third segment; and transmitting, using the one or more antennas, the UE device signature to the satellite constellation after the second time.

16. The method of claim 13, wherein the data comprises a text message, the first segment comprises a first string of the text message, the second segment comprises a second string of the text message, and the third segment comprises a third string of the text message.

17. An electronic device comprising:

a touch screen display configured to receive an input associated with wireless data for transmission by the electronic device;

a radio configured to convey radio-frequency signals with a cellular network while the cellular network is available to the electronic device; and one or more antennas configured to transmit to a communications satellite, while the cellular network is unavailable to the electronic device, a series of segments of the wireless data prior to the input including a send instruction, and a remainder of the wireless data after the input includes the send instruction.

18. The electronic device of claim 17, wherein the series of segments comprises a first text string received by the touch screen display at a first time and a second text string received by the touch screen at a second time after the first time.

19. The electronic device of 17, further comprising:

one or more processors configured to generate a signature by signing the series of segments and the remainder of the wireless data, the one or more antennas being configured to transmit the signature to the communications satellite after the input includes the send instruction.

20. The electronic device of claim 17, wherein the wireless data comprises a text message, the send instruction includes a message send button press received by the touch screen display, the series of segments includes a first text string of the text message that is received by the touch screen display, the series of segments includes a second text string of the text message that is received by the touch screen display after the first text string, the touch screen display is configured to display the text message prior to the touch screen display receiving a message send button press, and the one or more antennas are configured to transmit a remainder of the text message responsive to the touch screen receiving a message send button press, the remainder of the text message being received by the touch screen display after the second text string.

* * * * *